US012223821B1

(12) United States Patent
McDonald et al.

(10) Patent No.: US 12,223,821 B1
(45) Date of Patent: Feb. 11, 2025

(54) ANTI-DEFEAT MAGNETICALLY ACTUATED PROXIMITY SENSOR

(71) Applicant: M2 Companies, Inc., Pomona, CA (US)

(72) Inventors: Michael P. McDonald, Ontario, CA (US); Morgan L. Morgan, Jr., Pomona, CA (US)

(73) Assignee: M2 Companies, Inc., Pomona, CA (US)

( * ) Notice: Subject to any disclaimer, the term of this patent is extended or adjusted under 35 U.S.C. 154(b) by 257 days.

(21) Appl. No.: 17/834,722

(22) Filed: Jun. 7, 2022

Related U.S. Application Data

(60) Provisional application No. 63/208,412, filed on Jun. 8, 2021.

(51) Int. Cl.
*G08B 23/00* (2006.01)
*H01H 36/00* (2006.01)

(52) U.S. Cl.
CPC ........... *G08B 23/00* (2013.01); *H01H 36/008* (2013.01)

(58) Field of Classification Search
CPC ........ G08B 23/00; G08B 13/08; G08B 13/00; G08B 21/18; G08B 29/046; H01H 36/0026; H01H 36/0066; H01H 36/006; H01H 36/0046; H01H 36/008
See application file for complete search history.

(56) References Cited

U.S. PATENT DOCUMENTS

| | | | | |
|---|---|---|---|---|
| 4,209,777 A * | 6/1980 | Morrison | G08B 13/08 | 340/539.1 |
| 4,210,889 A | 7/1980 | Holce | | |
| 5,233,323 A | 8/1993 | Burkett et al. | | |
| 5,534,849 A * | 7/1996 | McDonald | G08B 13/08 | 340/517 |
| 5,668,533 A * | 9/1997 | Jackson, Jr. | H01H 36/0026 | 335/205 |
| 8,063,725 B2 * | 11/2011 | Ellis | H01H 1/66 | 335/151 |
| 2003/0052780 A1 * | 3/2003 | Buckley | H01H 36/0046 | 340/547 |
| 2005/0077989 A1 * | 4/2005 | Edmonson, Jr. | H01H 36/0013 | 335/207 |

(Continued)

OTHER PUBLICATIONS

Interlogix, "High Security Surface Mount Magnetic Contacts," Interlogix (Sentrol) 2707A-L, Jul. 2013, https://static.interlogix.com/75105_high_sec_surf_mt_cont_ds.pdf, 2 pages.

(Continued)

*Primary Examiner* — Adnan Aziz
(74) *Attorney, Agent, or Firm* — Knobbe, Martens, Olson & Bear, LLP

(57) ABSTRACT

An anti-defeat magnetically actuated proximity sensor including a switch unit and an actuating unit in separate housings. The switch unit can include one or more biased or non-biased magnetic reed switches, circuit boards, armored cable and wires. The actuating unit can include one or more magnets of specific polarity. The physical arrangement of the one or more reed switches of the circuit boards and the one or more magnets of the actuating unit result in the proximity sensor's anti-defeat characteristics.

28 Claims, 11 Drawing Sheets

(56) References Cited

U.S. PATENT DOCUMENTS

| | | | | |
|---|---|---|---|---|
| 2006/0181374 | A1* | 8/2006 | Lee | H01H 36/0046<br>335/78 |
| 2010/0245089 | A1* | 9/2010 | Woods | G08B 25/10<br>340/568.1 |
| 2012/0194307 | A1* | 8/2012 | Woods | H01H 36/0046<br>335/206 |
| 2013/0265162 | A1* | 10/2013 | Buckley | G08B 21/18<br>340/545.1 |
| 2019/0211585 | A1* | 7/2019 | Lowder | E05B 55/00 |
| 2022/0189271 | A1* | 6/2022 | Carlson | G01R 33/02 |

OTHER PUBLICATIONS

"Magnasphere HS Series", Magnasphere Corp., Jul. 2014, https://magnasphere.com/hs-series/, in 2 pages.

Resideo, "Honeywell Home Proseries Platform by Resideo" ProSeries PROA7, Feb. 2021, https://digitalassets.resideo.com/damroot/Original/10015/L_PSA7EURB_D.pdf, 8 pages.

Maxsys®, "High-End Integrated Security from DSC," DSC Maxsys PC4020, © 2006 Digital Security Controls Ltd., May 2006, https://cms.dsc.com/download.php?t=1&Id=14877, in 12 pages.

Maxsys®, "Integrated Systems Technology, PC4020," © 2002 Digital Security Controls Ltd., Jul. 2002, https://cms.dsc.com/download.php?t=1&id=14879, in 2 pages.

ELK Products, "M1 The Smart Control Solution Focused on Security," Data Sheet, www.elkproducts.com/m1, M1+Security+&+Automation+Controls+-+Data+Sheet.pdf_(elk-datasheets.s3.amazonaws.com), printed on Jun. 7, 2022, in 2 pages.

* cited by examiner

2ND PCB
130
132
152

1ST PCB
120
122
142
110 SWITCH

ANTI-DEFEAT MAGNETICALLY ACTUATED PROXIMITY SENSOR

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application claims priority to U.S. Provisional Application No. 63/208,412, titled, "ANTI-DEFEAT MAGNETICALLY ACTUATED PROXIMITY SENSOR," filed on Jun. 8, 2021, the entire contents of which are incorporated by reference herein in its entirety for all purposes and forms a part of this specification.

TECHNICAL FIELD

The present disclosure relates to the field of magnetically actuated proximity sensors.

BACKGROUND

Many facilities and installations, including high security facilities, typically include proximity sensors at one or more points of ingress or egress, such as doors, windows, and the like, as part of a monitoring, alarm, and/or security system. Proximity sensors generally include a switch with a magnetically actuated reed switch and an actuating magnet. For example, the actuating magnet changes the state of the reed switch as the magnet moves in and out of proximity of the reed switch. Thus, if the magnet is mounted, for example, to a door panel and the reed switch is mounted to the door frame, as the door is opened or closed, the reed switch will change its electronic state.

With current designs, it may be possible to defeat the security of the proximity sensor by placing a magnet similar to that of the proximity sensor's magnet next to the switch, keeping the switch in a secured condition while the ingress/egress point is bypassed without triggering the monitoring, alarm, and/or security system. For example, if a second magnet is introduced into the door/door panel/door frame example above, and the second magnet is kept proximately static as the door is opened, the magnetic field of the second magnet may prevent the reed switch from changing its electronic state, thus, defeating the proximity sensor.

SUMMARY

Disclosed herein is an anti-defeat magnetically actuated proximity sensor comprising a switch unit (which can also be referred to herein as a "switch housing") and an actuating unit (which can also be referred to herein as an "actuator unit" or "actuator housing"). The switch unit can comprise a first printed circuit board (which can also be referred to herein as a "first circuit board"). The first printed circuit board may include one or more switches arranged along a first plane substantially parallel with a plane of the first printed circuit board. The one or more switches may each have a first switch state and a second switch state. Furthermore, the one or more switches may comprise reed switches. The first printed circuit board can also include one or more biasing magnets corresponding to the one or more reed switches such that in some embodiments, each one of the one or more reed switches has a corresponding biasing magnet. The one or more biasing magnets may advantageously be arranged adjacent its corresponding reed switch thereby, magnetically biasing the one or more reed switches to a first polarity and the second switch state. The switch unit can additionally comprise a second printed circuit board (which can also be referred to herein as a "second circuit board"). The second printed circuit board includes: one or more switches arranged along a second plane. The one or more switches of the second printed circuit board may comprise reed switches. The second plane is substantially parallel with a plane of the second printed circuit board. The one or more reed switches each have a first switch state and a second switch state. The second printed circuit board can also include one or more biasing magnets corresponding to the one or more reed switches such that each one of the one or more reed switches has a corresponding biasing magnet and each one of the one or more biasing magnets is arranged adjacent its corresponding reed switch. The biasing magnets advantageously bias the one or more reed switches to a second polarity that is opposite the first polarity and the second switch state. The first plane is substantially parallel to the second plane and separated from the second plane by a distance. The actuating unit may advantageously include one or more permanent magnets. Each of the permanent magnets may in some embodiments include a first pole at the first polarity and a second pole at the second polarity.

In an embodiment, the sensor 100 is in the secured condition (which can also be referred to herein as a "secure state," "secured state." "secure position," or "secured position") when one or more magnets in the actuating unit is aligned between and below two printed circuit boards of a switching unit. In the embodiment of multiple magnets, each magnet is positioned between and below the two printed circuit boards. The boards position one or more reed switches, and the magnet biases the switches when the magnet rests between and below the boards. In an embodiment, the bias overrides a bias already on the reed switch(es). In some embodiments, the magnet is aligned relative to the reed switches such that the magnetic field biases one of the switches with one polarity and biases the other of the switches with the opposite polarity. When the actuating unit moves, such as, for example, as a window opens, the magnet moves beyond its ability to properly bias the switches and a change in state signals an alarm of an insecure status of the sensor.

In an embodiment, the switch unit and/or the actuating unit each include an outer housing. In other embodiments, the housings are potted (e.g., filled with encapsulate) after electronics are positioned to affix the positioning within the housing. In an embodiment, encapsulation resins and/or potting compounds are used to protect the electronics from tamper and any harsh operating conditions, including protecting from chemicals, dust, heat, water, corrosive atmospheres, physical shock, or just the general environmental conditions.

In the above proximity sensor or in other embodiments as described herein, one or more of the following features can also be provided. In some embodiments, the one or more reed switches of the first printed circuit board are electrically interconnected with the one or more reed switches of the second printed circuit board. In some embodiments, the first switch state corresponds to the switch being closed and the second switch state corresponds to the switch being open. In some embodiments, the proximity sensor is in an alarm condition (which can also be referred to herein as an "alarm state") when any one of the one or more reed switches of the first printed circuit board or any one of the one or more reed switches of the second printed circuit board are in the second switch state.

In some embodiments, the proximity sensor is in a secure state when the one or more reed switches of the first printed circuit board and the one or more reed switches of the second printed circuit board are in the first switch state. In some embodiments, each of the switch unit and the actuating unit are contained within non-magnetic tubular housings. In some embodiments, the housing of the switch unit further comprises an input for armored cabling with conducting wires that form electrical connections with the first and/or second printed circuit boards and/or components thereof.

In some embodiments, the first printed circuit board further comprises one or more non-biased magnetic-tamper reed switches each having a first switch state and a second switch state, the one or more magnetic-tamper reed switches are configured to change from the first switch state to the second switch state in the presence of an external magnetic field. In some embodiments, the one or more magnetic-tamper reed switches comprise two magnetic-tamper reed switches arranged orthogonal to one another. In some embodiments, the proximity sensor is in a magnetic-tamper alarm state when any one of the one or more magnetic-tamper reed switches are in the second switch state.

In some embodiments, the proximity sensor further comprises a pry-tamper spacer comprising a permanent magnet, the pry-tamper spacer configured to be installed adjacent a side of the switch unit near the second printed circuit board, wherein the second printed circuit board further comprises a pry-tamper reed switch having a first switch state and a second switch state, the pry-tamper reed switch configured to change from the second switch state to the first switch state when the pry-tamper spacer is installed adjacent a side of the switch unit near the second printed circuit board. In some embodiments, the proximity sensor is in a pry-tamper alarm state when the pry-tamper reed switch is in the second switch state.

In some embodiments, the distance between the first plane and the second plane is less than about 1 inch. In some embodiments, the predefined range in between the first and second planes is less than about 0.75 inches centered in between the first and second planes. In some embodiments, the predefined distance from the switch unit is less than about 0.75 inches.

In some embodiments, the one or more reed switches and the one or more biasing magnets of the first printed circuit board comprise two reed switches and two biasing magnets, and wherein the one or more reed switches and the one or more biasing magnets of the second printed circuit board comprise two reed switches and two biasing magnets. In some embodiments, the two reed switches and two biasing magnets of the first printed circuit board are arranged at opposite ends of the first printed circuit board, and wherein the two reed switches and two biasing magnets of the second printed circuit board are arranged at opposite ends of the second printed circuit board. In some embodiments, the opposite ends of the first and second printed circuit boards generally align with one another such that two reed switches of the first printed circuit board form pairs with the two reed switches of the second printed circuit board across the distance between the first and second planes. In some embodiments, the one or more permanent magnets of the actuating unit comprise two permanent magnets, and wherein each one of the two permanent magnets is arranged within the actuating unit to be adjacent one of each pair of the reed switches. In some embodiments, the first polarity comprises magnetic South and the second polarity comprises magnetic North.

Disclosed herein is a proximity sensor configured to change from a secured condition to an alarm condition responsive to a proximity between a movable element to a stable structure, the secured condition and the alarm condition discernible by a security system, the sensor comprising a switch housing and an actuator housing. The switch housing operably positions first and second circuit boards within the switch housing and is configured to operably mount to a stable structure. The actuator housing operably positions a magnet within the actuator housing and is configured to operably mount to an element movable with respect to the stable structure. Furthermore, the actuator housing is operably mounted to be proximate the switch housing when the moveable element is secured with respect to the stable structure. The first circuit board includes a first switch including first and second states. The second circuit board includes a second switch including first and second states. When the actuator housing is proximate the switch housing, the first switch is responsive to the magnet to be in its first state and the second switch is responsive to the magnet to be in its first state thereby placing the sensor in the secured condition. Furthermore, when the actuator housing is moved away from the switch housing, at least one of the first switch and the second switch changes to its second state thereby placing the sensor in the alarm condition.

In the above proximity sensor or in other embodiments as described herein, one or more of the following features can also be provided. In some embodiments, the first circuit board further includes a third switch including first and second states; the second circuit board further includes a fourth switch including first and second states; and the magnet comprises a first magnet and the actuator housing positions a second magnet within the actuator housing. When the actuator housing is proximate the switch housing. (i) the first switch is responsive to the first magnet to be in its first state, (ii) the third switch is responsive to the second magnet to be in its first state, (iii) the second switch is responsive to the first magnet to be in its first state, and (iv) the fourth switch is responsive to the second magnet to be in its first state, all of (i)-(iv) thereby placing the sensor in the secured condition. Furthermore, when the actuator housing is moved away from the switch housing, at least one of the first, second, third, and fourth switches changes to its second state thereby placing the sensor in the alarm condition.

For purposes of summarizing the disclosure, certain aspects, advantages and novel features of several implementations have been described herein. It is to be understood that not necessarily all such advantages are achieved in accordance with any particular implementation of the technology disclosed herein. Thus, the implementations disclosed herein can be implemented or carried out in a manner that achieves or optimizes one advantage or group of advantages as taught herein without necessarily achieving other advantages that can be taught or suggested herein.

BRIEF DESCRIPTION OF THE DRAWINGS

Certain features of this disclosure are described below with reference to the drawings. The illustrated implementations are intended to illustrate, but not to limit, the implementations. Various features of the different disclosed implementations can be combined to form further implementations, which are part of this disclosure.

DETAILED DESCRIPTION

Figure 1A:
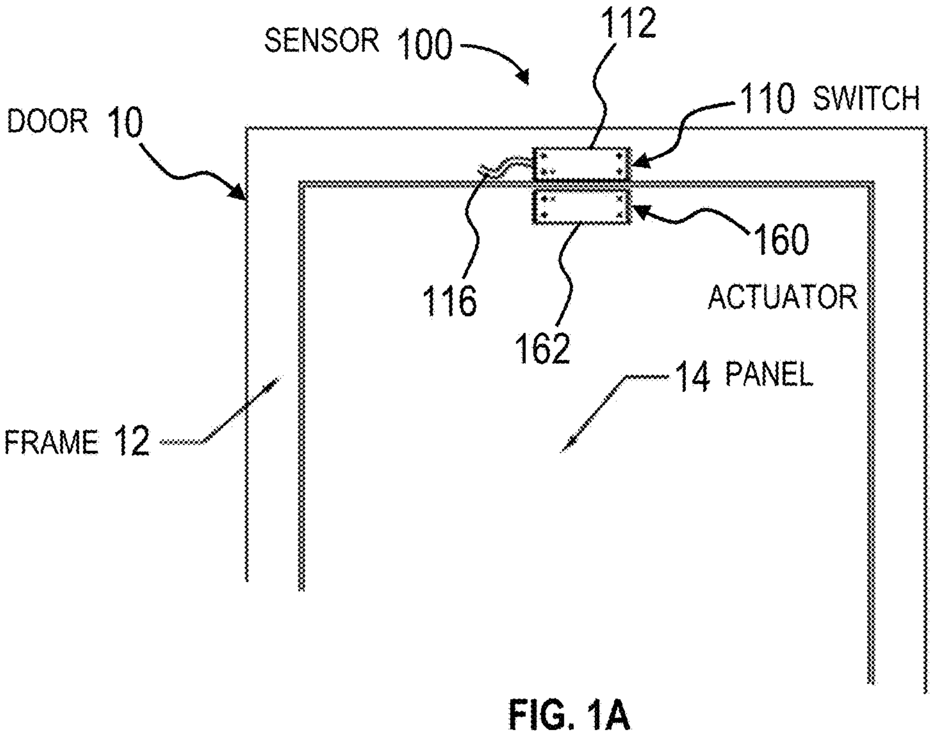
FIGS. 1A-1B illustrates various views of an anti-defeat magnetically actuated proximity sensor secured to an out-swing side of a door in accordance with some aspects of this disclosure.

Various features and advantages of this disclosure will now be described with reference to the accompanying figures. The following description is merely illustrative in nature and is in no way intended to limit the disclosure, its application, or uses. This disclosure extends beyond the specifically disclosed implementations and/or uses and obvious modifications and equivalents thereof. Thus, it is intended that the scope of this disclosure should not be limited by any particular implementations described below. The features of the illustrated implementations can be modified, combined, removed, and/or substituted as will be apparent to those of ordinary skill in the art upon consideration of the principles disclosed herein. Furthermore, implementations disclosed herein can include several novel features, no single one of which is solely responsible for its desirable attributes or which is essential to practicing the systems, devices, and/or methods disclosed herein.

Embodiments of the present disclosure include an anti-defeat magnetically actuated proximity sensor. Proximity sensors advantageously provide an alert signal when one portion of the sensor is distanced from another portion of the sensor. For example, if one portion is affixed to a window and another to a window sill, if the window opens, whether it slides or pivots or some combination of both, the sensor changes state and a different signal can be detected. Thus, proximity sensors are often used to secure doors, windows, cabinets, safes, hanging art or the like. They are also used in high security facilities, vaults, armories, nuclear facilities. In some embodiments, the sensor alerts when a door is opened, or even if an intruder attempts to tamper with the sensor. However, an artisan will recognize from the disclosure herein that the proximity sensor could be used on windows, sliding doors, rollups, or virtually any placement where one wants to monitor the separation of one structure from another. Embodiments of the present disclosure could be employed to generate an alert to a change in the proximity of one structure to any other.

In embodiments of the disclosure, the anti-defeat magnetically actuated proximity sensor proximity sensor can include a switch unit and an actuating unit. The switch unit can include a first printed circuit board and a second printed circuit board. In an embodiment, each board includes one or more reed switches soldered or otherwise affixed or positioned thereon. A housing may advantageously include caps and non-magnetic (e.g., aluminum) tubing, armored cable and conducting wires.

Some of the reed switches can be "biased" and others can be "non-biased." "Biased" includes its broad ordinary meaning recognizable to an artisan from the disclosure herein, which includes that the reed switch state, either open circuit (e.g., open switch state) or closed circuit (e.g., closed switch state), is changed from one state to the other by attaching a small magnet to or adjacent its surface. In an embodiment, the actuating unit can include one or more magnets of specific polarity, a magnet positioner (which can also be referred to herein as a "magnet holder" or "magnet mount"), and a housing including caps and non-magnetic (e.g., aluminum) tubing. In some embodiments, the first and second printed circuit boards with one or more reed switches of the switch unit and the one or more magnets of the actuating unit can be potted inside their respective (e.g., separate) housings. The switch unit can generally be mounted to a stationary and/or non-moving component of a structure and/or an ingress/egress point to be monitored (e.g., due to the armored cable and conducting wires extending therefrom), and the actuating unit can generally be mounted to a moving component of the structure and/or the ingress/egress point to be monitored (e.g., due to no such corresponding cabling/wires extending therefrom). However, an artisan will recognize from the disclosure herein that these can be swapped.

Embodiments of the disclosure result in a sensor that is almost impossible to defeat at least because of the multiple printed circuit boards with "biased" reed switches and the one or more magnets of the actuating unit being on a different plane from the biased reed switches. For example, when the switch unit is mounted to a door frame, the biased reed switches of the first and second printed circuit boards will be on two different planes, both parallel to the door frame. The reed switches on the first printed circuit board will be biased to a different magnetic polarity to the reed switches on the second printed circuit board. Meanwhile, the actuating unit with one or more magnets can present opposing magnetic fields to activate the biased switches on both printed circuit boards.

In a secure state (which can also be referred to herein as a "secure position"), with the switch unit mounted to a door frame and the actuating unit mounted to a door panel, the one or more magnets inside of the actuating unit will be on a plane between the planes of biased reed switches of the first and second printed circuit boards. The one or more magnets will provide an opposite magnetic field to each of the "biased" reed switches on the printed circuit boards, for example, magnetic south pole for the printed circuit closest to the door frame, and magnetic north pole for the printed circuit board furthest from the door frame. As the door opens, the one or more magnets will provide a reversing magnetic field onto one of the printed circuit boards of the switch unit, changing the state of the reed switches and triggering a monitoring, alarm, and/or security system. This feature makes it extremely difficult to substitute a second false magnet (e.g., a spoof magnet) as the reversing of the magnetic field as the door is opened upsets the magnetic field of the substituting magnet.

In embodiments of this disclosure, the two printed circuit boards are spaced apart, with opposite magnetic fields, to ensure it to be virtually, substantially, or nearly, if not actually, impossible to substitute a spoof magnet to defeat the proximity sensor. This is at least in part because the two printed circuit boards require different magnetic fields of opposite polarities and specific strength. The distance between each board eliminates or substantially, nearly eliminates the possibility of a substitute magnet being able to have the magnetic field strength to balance the magnetic field on both printed circuit boards without overpowering the magnetic field on one of the printed circuit boards, and thereby, triggering a state change in one of the reed switches.

Figure 1B:
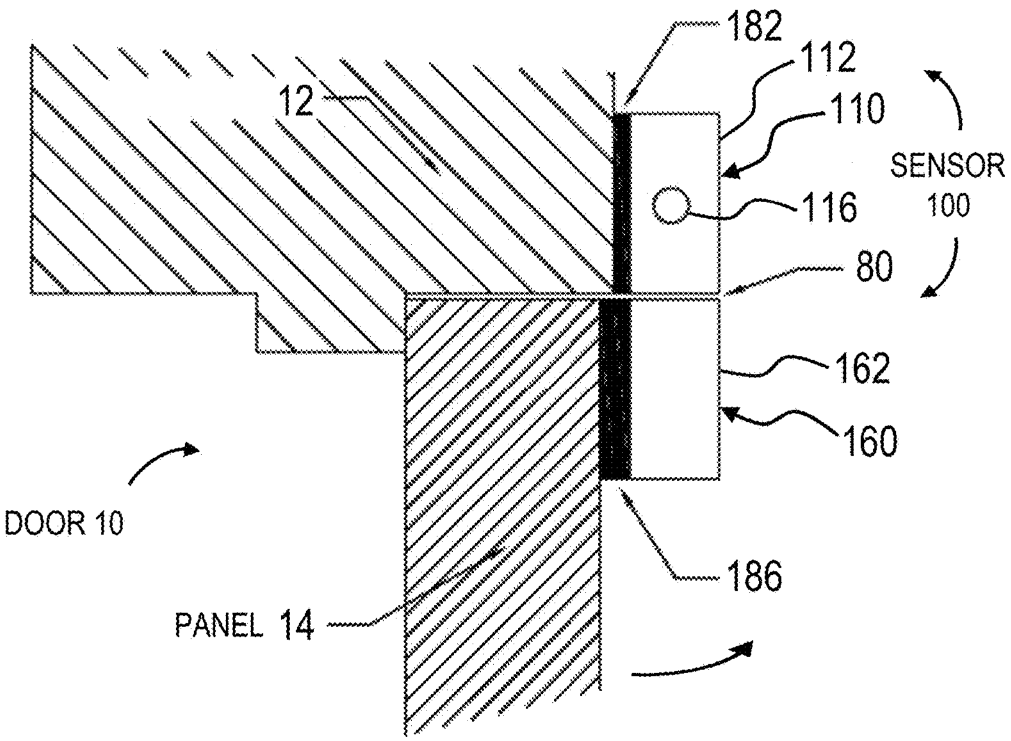

FIG. 1A shows the anti-defeat magnetically actuated proximity sensor 100 (which can also be referred to herein as a "proximity sensor" or "sensor") secured to an outswing side of a door 10. FIG. 1B shows a cross-sectional view of the door 10 with the proximity sensor 100 secured thereto. The door 10, as typical with most doors, windows, and/or secured points of ingress/egress, can have a stationary or non-moving portion, such a frame 12, and a moving portion, such as a door panel 14. As shown in FIGS. 1A-1B, the door 10 is closed with the door panel 14 against its frame 12. The proximity sensor 100 can include a switch unit 110 and an actuating unit 160, each with their own housings 112 and 162 as shown and mounted adjacent or at least proximate to one another. For example, the switch unit 110 may advantageously be mounted to the stationary frame 12 and the actuating unit 160 mounted on the moving door panel 14.

FIGS. 1A-1B also show in some embodiments, the sensor 100 may include armored cable 116 with conducting wires extending from the housing 112 of the switch unit 110 for connecting the switch unit 110 to a monitoring, alarm, and/or security system.

An artisan will recognize from the disclosure a large number of commercially available alarm monitoring systems that detect a changed electrical state of a proximity sensor, such as, for example, the Honeywell Proseries PROA7, the DSC MAXSYS PC4020, the ELK M1, and others recognizable to one of skill in the art, any of which can utilize one or more proximity sensors 100 as described herein.

In some implementations and as shown in FIG. 1B, the switch unit 110 and/or the actuating unit 160 can be mounted to the door 10 with one or more spacers, such as a pry-tamper spacer 182 and/or a spacer 186. Spacers 182 and 186 have various functions, including aiding in aligning the switch unit 110 and actuating unit 160 as will be discussed herein.

FIG. 1B also identifies a distance or gap 80 between the housing 112 of the switch unit 110 and the housing 162 of the actuating unit 160 when installed. As will be discussed further herein, when the proximity sensor 100 is mounted with the switch unit 110 adjacent the actuating unit 160 as shown in FIGS. 1A-1B and the door 10 is closed (e.g., the door panel 14 is closed against the frame 12), the proximity sensor 100 is in a secure state. Upon opening of the door 10 (e.g., the door panel 14 is opened away from the frame 12, moving the actuating unit 160 relative to the switch unit 110), the proximity sensor 100 is in an alarm state as will be discussed further herein.

Figure 2A:
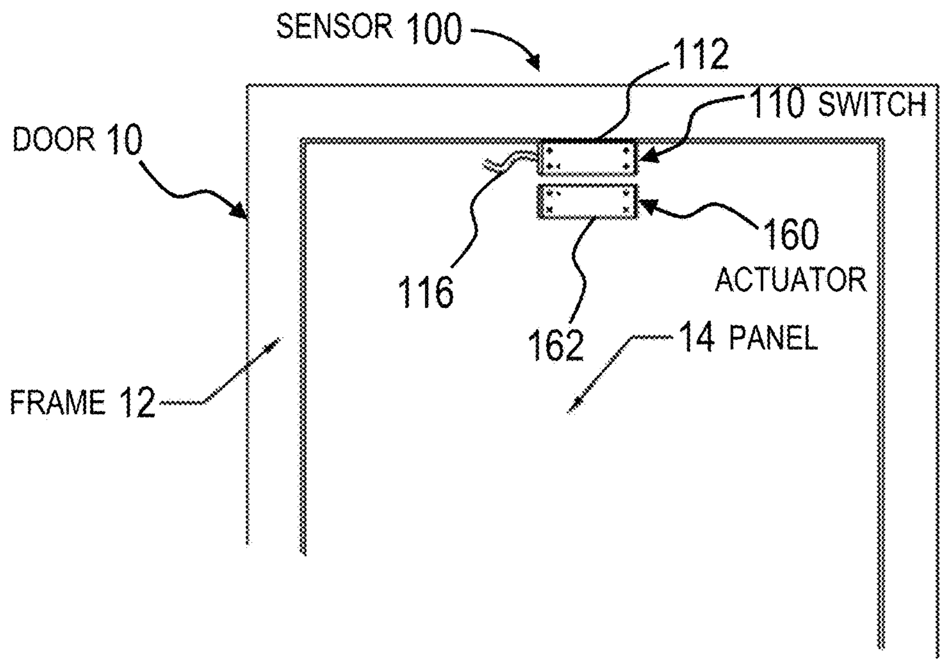
FIGS. 2A-2B illustrates various views of an anti-defeat magnetically actuated proximity sensor secured to an inswing side of a door in accordance with some aspects of this disclosure.
Figure 2B:
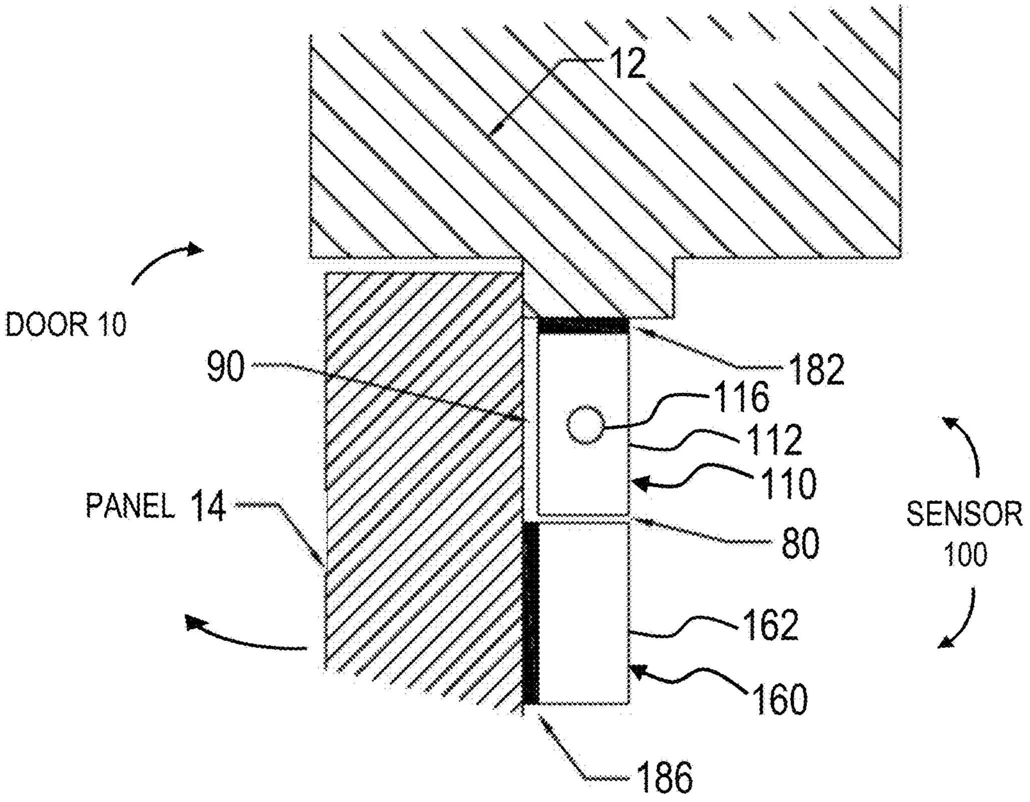

FIG. 2A shows the anti-defeat magnetically actuated proximity sensor 100 secured to an inswing side of the door 10. FIG. 2B shows a cross-sectional view of the door 10 with the proximity sensor 100 secured thereto. As shown in FIGS. 2A-2B, the door 10 is closed with the door panel 14 against its frame 12. Similar to FIGS. 1A-1B, in FIGS. 2A-2B the switch unit 110 is shown mounted to the stationary frame 12 and the actuating unit 160 is shown mounted to the moving door panel 14. Also shown, the switch unit 110 and/or the actuating unit 160 can be mounted to the door 10 with one or more spacers such as pry-tamper spacer 182 and/or spacer 186 as will be discussed further herein. Furthermore, the switch unit 110 and the actuating unit 160 can be installed with the distance or gap 80 therebetween (e.g., between their respective housings 112 and 162). Distinct to the installation on an inswing side of the door 10, the switch unit 110 can be mounted to the frame 12 such that a second distance or second air gap 90 is formed between the housing 112 of the switch unit 110 and the door panel 14 when the door panel 14 is closed against its frame 12. The air gap 90 can help ensure that the door panel 14 does not hit upon the switch unit 110 when in use. The air gap 90 can be about 0.0625 inches (1/16"), about 0.125 inches (1/8"), about 0.25 inches (1/4"), within the range of about 0.0625 inches to about 0.25 inches, less than about 0.0625 inches, or more than about 0.25 inches. As will be discussed further herein, when the proximity sensor 100 is mounted with the switch unit 110 adjacent the actuating unit 160 as shown in FIGS. 2A-2B and the door 10 is closed (e.g., the door panel 14 is closed against the frame 12), the proximity sensor 100 is in a secure state. Upon opening of the door 10 (e.g., the door panel 14 is opened away from the frame 12, moving the actuating unit 160 relative to the switch unit 110), the proximity sensor 100 is in an alarm state as will be discussed further herein.

Figures 3A, 3B, 3C, 3D:
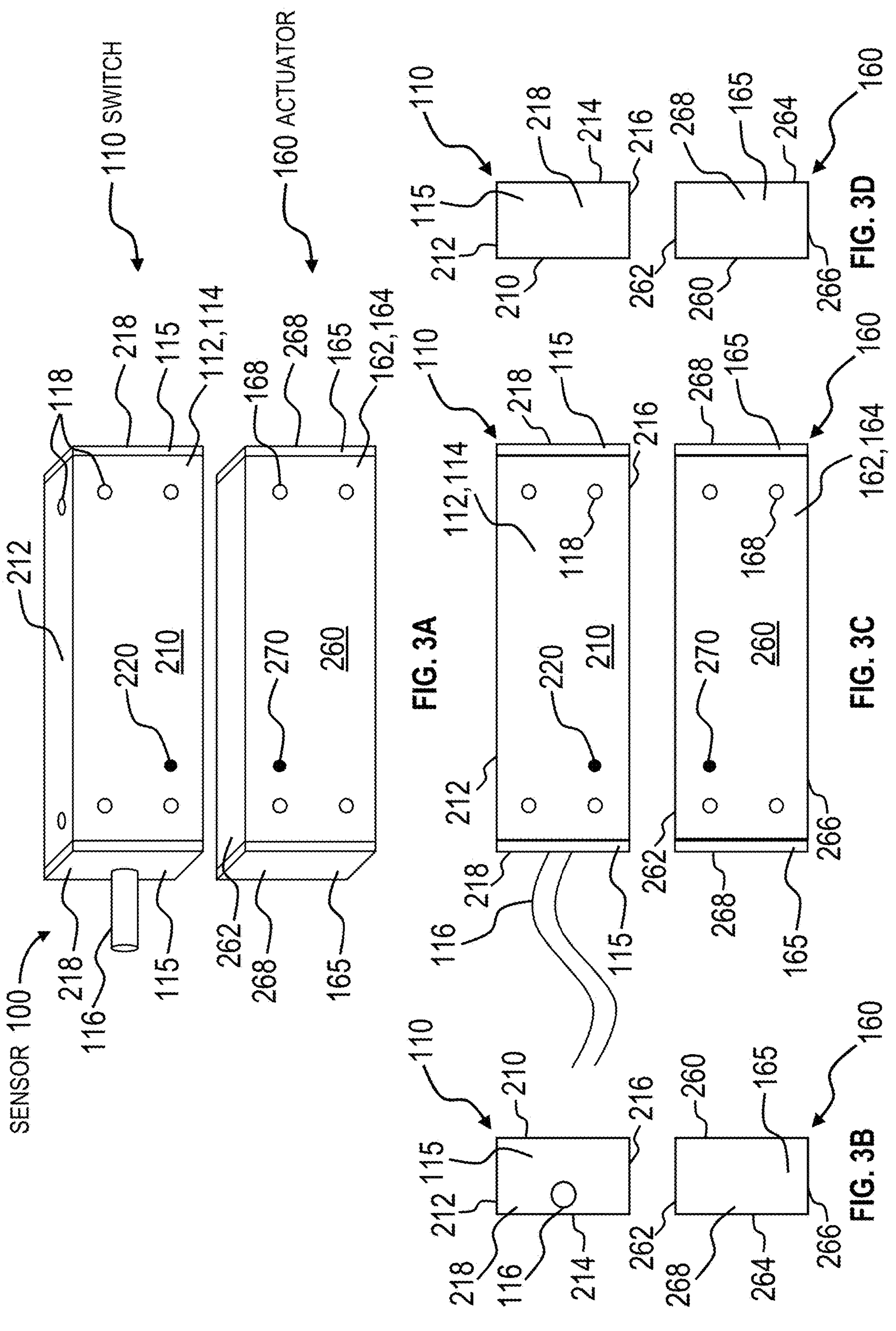
FIGS. 3A-3D illustrate various views of an anti-defeat magnetically actuated proximity sensor in accordance with some aspects of this disclosure.

FIGS. 3A-3D show various views of an embodiment of the anti-defeat magnetically actuated proximity sensor 100. FIG. 3A shows a front perspective view, FIG. 3B a side view, FIG. 3C a front view, and FIG. 3D another side view. As shown, the proximity sensor 100 can include a switch unit 110 and an actuating unit 160, each having separate housings 112 and 162, respectively. The housing 112 of the switch unit and the housing 162 of the actuating unit can be generally of similar shape and size, which can advantageously aid in alignment during installation. In some embodiments, the housing 112 of the switch unit is substantially the same shape and size as the housing 162 of the actuating unit 160.

The housing 112 of the switch unit 110 can be configured to prevent and/or deter tampering with the switch unit 110. The housing 112 can include tubing 114, caps 115, and an input for armored cable 116 with conducting wires. The tubing 114 can be non-magnetic (e.g., aluminum) so as not to interfere with operation of the proximity sensor 100, and as shown can be a section of rectangular tubing. The caps 115 can be configured to seal ends of the tubing 114 and can comprise polyethylene or the like. One of the caps 115 can be configured for the input of armored cable 116 as shown. Altogether, the housing 112 can comprise a generally elongate tubular structure having a front 210, a top 212, a back 214, a bottom 216, and sides 218 as shown in FIGS. 3A-3D. The housing 112 can be sized to accept components of the switch unit 110 and can have a width (e.g., from side 218 to side 218) ranging from about 0.5 inches to about 12.0 inches, a height (e.g., from top 212 to bottom 216) ranging from about 0.5 inches to about 5.0 inches, and a depth (e.g., from front 210 to back 214) ranging from about 0.5 inches to about 5.0 inches. In a preferred embodiment, the housing 112 can have a width of about 4.5 inches, a height of about 1.5 inches, and a depth of about 1.0 inches. For securing the switch unit 110 to a structure, the housing 112 can have one or more mounting holes 118 comprising through holes. The one or more mounting holes 118 can extend from front 210 to back 214 and/or from bottom 216 to top 212 of the housing 112. As an example, the housing 112 can have four mounting holes 118 spaced apart and extending through the housing from front 210 to back 214 and two mounting holes 118 spaced apart and extending through the housing from bottom 216 to top 212. Such a configuration of mounting holes 118 can allow for the switch unit 110 to be mounted to structures of various configurations, such as an outswing side or an inswing side of a door 10 as shown in FIGS. 1A-1B and FIGS. 2A-2B.

The housing 162 of the actuating unit 160 can be configured to prevent and/or deter tampering with the actuating unit 110. The housing 162 can include tubing 164 and caps 165. The tubing 164 can be non-magnetic (e.g., aluminum) so as not to interfere with operation of the proximity sensor 100, and as shown can be a section of rectangular tubing. The caps 165 can be configured to seal ends of the tubing 164 and can comprise polyethylene or the like. Altogether, the housing 162 can comprise a generally elongate tubular structure having a front 260, a top 262, a back 264, a bottom 266, and sides 268 as shown in FIGS. 3A-3D. The housing 162 can be sized to accept components of the actuating unit 160 and can have a width (e.g., from side 268 to side 268) ranging from about 0.5 inches to about 12.0 inches, a height (e.g., from top 262 to bottom 266) ranging from about 0.5 inches to about 5.0 inches, and a depth (e.g., from front 260 to back 264) ranging from about 0.5 inches to about 5.0 inches. In a preferred embodiment, the housing 162 can have a width of about 4.5 inches, a height of about 1.5 inches, and a depth of about 1.0 inches. For securing the actuating unit 160 to a structure, the housing 162 can have one or more mounting holes 168 comprising through holes. The one or more mounting holes 168 can extend from front 260 to back 264. As an example, the housing 162 can have four mounting holes 168 spaced apart and extending through the housing from front 260 to back 264. Such a configuration of mounting holes 168 can allow for the actuating unit 160 to be mounted to structures of various configurations, such as an outswing side or an inswing side of a door 10 as shown in FIGS. 1A-1B and FIGS. 2A-2B.

The housing 112 of the switch unit 110 and the housing 162 of the actuating unit 160 can include indicia 220 and 270, respectively, configured to aid in alignment and proper positioning of the units during installation of the proximity sensor 100. As shown in FIGS. 3A and 3C, the indicia 220 and 270 can be visible from the front 210 and 260 of the switch unit 110 and the actuating unit 160, respectively, and can be generally located off-center relative to both height and width (e.g., towards a corner, or in other words in one of four quadrants when viewed from the front). For example and as shown, the indicia 220 of the switch unit 110 can be located in a lower left side when viewed from the front 210, and the indicia 270 of the actuating unit 160 can be located in an upper left side when viewed from the front 260. The indicia 220 and 270 can include an indentation, a mark, a logo, or any other indicia.

Figure 4A:
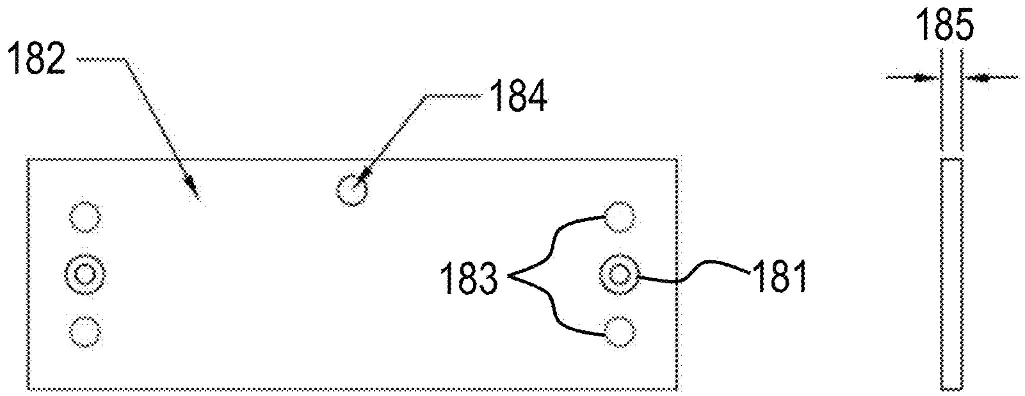
FIGS. 4A-4D illustrate various views of spacers that can be used with the anti-defeat magnetically actuated proximity sensor in accordance with some aspects of this disclosure.
Figure 4B:
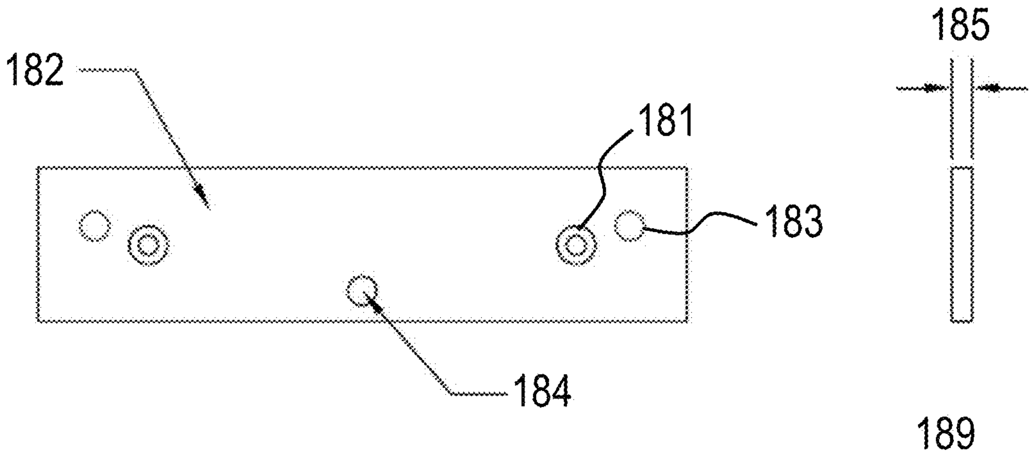
Figure 4C:
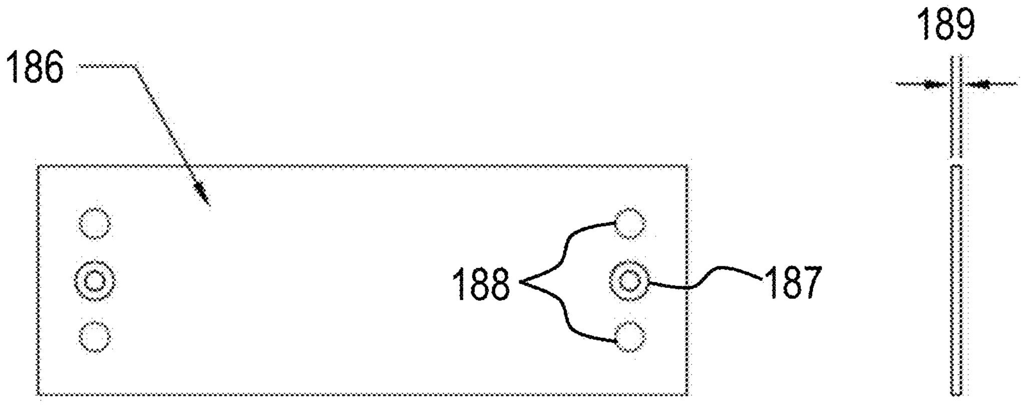
Figure 4D:
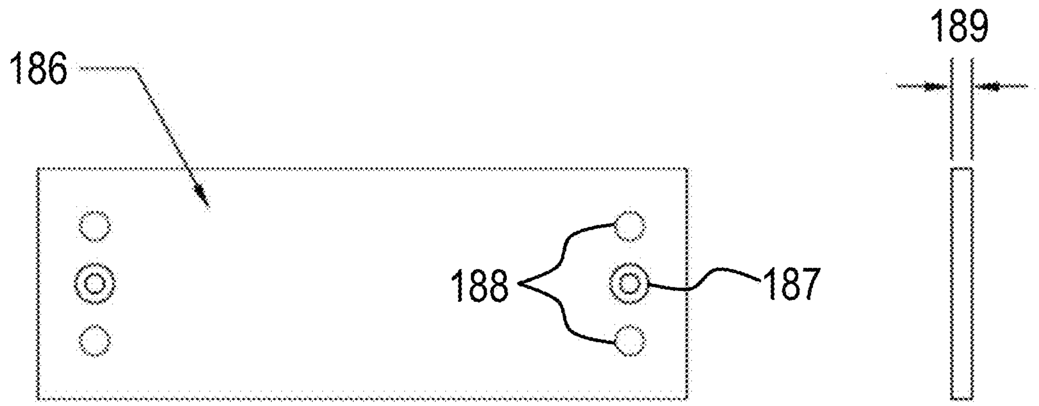

FIGS. 4A-4D show front and side views of various spacers that can be used with the proximity sensor 100. FIGS. 4A-4B show embodiments of a pry-tamper spacer 182 and FIGS. 4C-4D show embodiments of a spacer 186. As mentioned with respect to FIGS. 1A-1B and FIGS. 2A-2B, the spacers 182 and 186 shown in FIGS. 4A-4D or other embodiments thereof can be configured to enable proper positioning and alignment between the switch unit 110 and the actuating unit 160 of the proximity sensor 100 when installed. As such, the spacers 182 and 186 can have a size and shape generally matching the shape of the switch unit 110 and/or actuating unit 160, for example, a rectangular shape, so that the spacer is preferably mounted flush with surfaces of the switch and/or actuating units. The spacers 182 and 186 can be made of a rigid plastic, polymer, metal, or the like (e.g., Delrin), preferably non-magnetic, and can be provided with the proximity sensor 100 in a variety of thicknesses. Furthermore, each of the spacers 182 and 186 can include one or more through holes at locations where mounting hardware of the switch unit 110 and/or the actuating unit 160 would pass through when utilized, as well as mounting holes for mounting the spacer directly to the structure the switch unit 110 and/or the actuating unit 160 are mounted to prior to mounting the switch unit and/or actuating unit 160. Depending upon the installation site and the configuration of the proximity sensor 100, the use of a pry-tamper spacer 182 and/or spacer 186 can be optional or not required. Additionally, a pry-tamper spacer 182 is generally configured for use with a switch unit 110 and not an actuating unit 160.

As shown in FIGS. 4A-4B, the pry-tamper spacers 182 can include one or more through holes 183 and one or more mounting holes 181, the mounting holes 181 having a counter-sink so that mounting hardware of the pry-tamper spacers 182 does not substantially extend beyond the surface of the pry-tamper spacer 182 when installed. The pry-tamper spacers 182 can have a thickness 185, which can range from about 0.0625 inches (1/16") to about 0.5 inches (1/2"). The pry-tamper spacers 182 can additionally include a pry-tamper spacer magnet 184 configured to interact with one or more reed switches of the switch unit 110, such as a pry-tamper reed switch, as will be discussed herein. The pry-tamper spacer magnet 184 can be a neodymium magnet, such as neodymium 42, and can have a puck-like shape. Furthermore, the pry-tamper spacer magnet 184 can be embedded within the thickness of the pry-tamper spacer 182 such that it does not extend past its front or back surface so as to allow flush mounting of the pry-tamper spacer 182 (e.g., flush mounting with a door frame 12 and the switch unit 110 on either side). For example, the pry-tamper spacer magnet 184 can be a 3/16" diameter by 1/16" thick magnet, however other configurations and materials are considered within the scope of this disclosure. In some embodiments, such a pry-tamper spacer magnet 184 can be located generally central relative to a length of the pry-tamper spacer 182 and towards a top or bottom of the pry-tamper spacer 182.

As shown in FIGS. 4C-4D, the spacers 186 can include one or more through holes 188 and one or more mounting holes 187, the mounting holes 187 having a counter-sink so that mounting hardware of the spacers 186 does not substantially extend beyond the surface of the spacer 186 when installed. The spacers 186 can have a thickness 189, which can range from about 0.0625 inches (1/16") to about 0.5 inches (1/2").

Figure 5B:
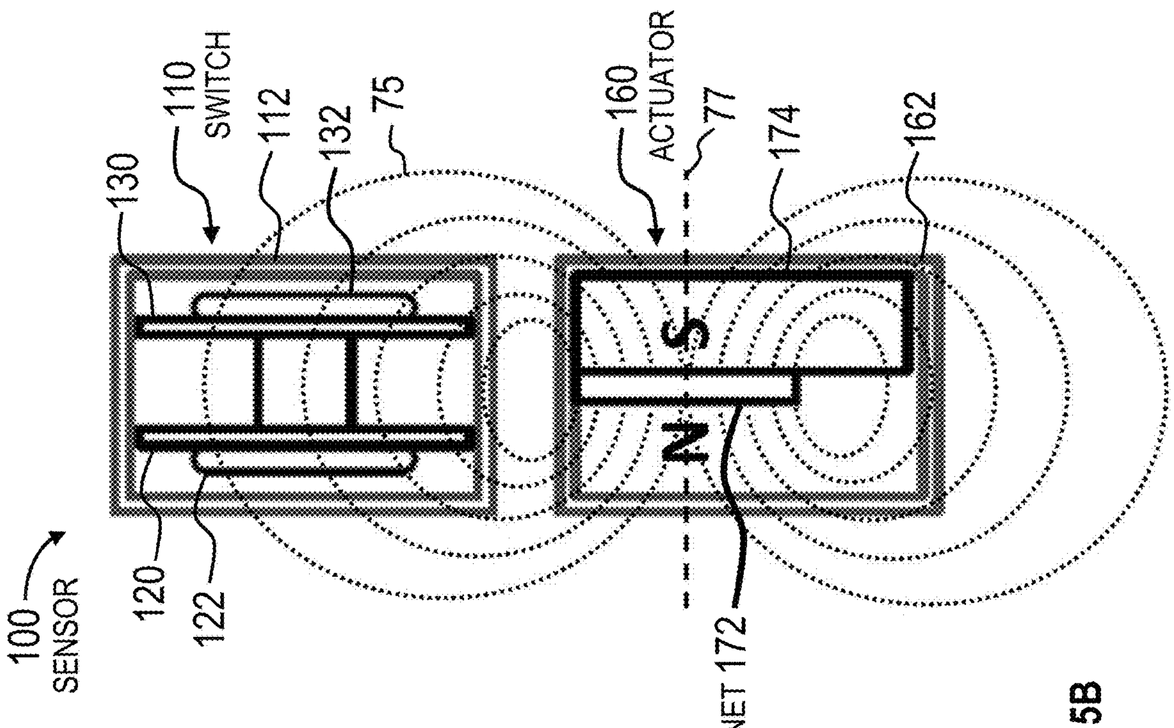
FIGS. 5A-5B illustrate cross-sectional views of the anti-defeat magnetically actuated proximity sensor in a secure state in accordance with some aspects of this disclosure.
Figure 5A:
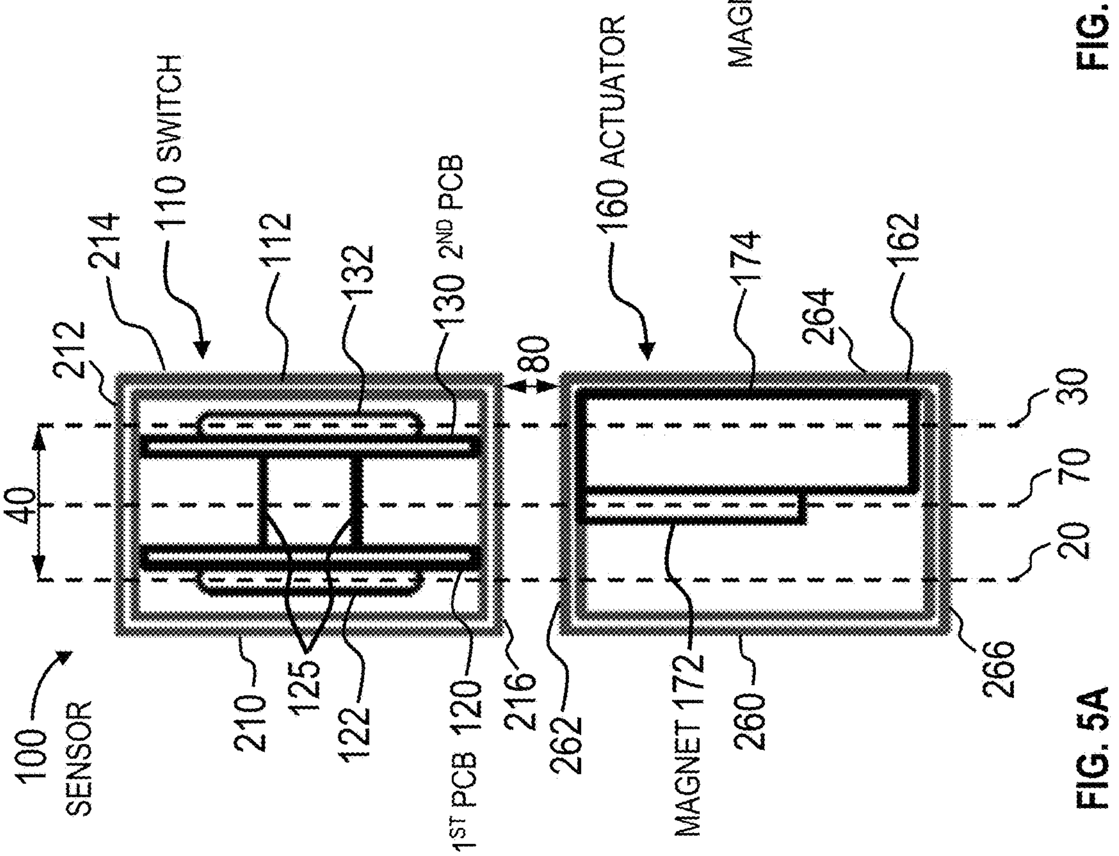

FIGS. 5A-5B illustrate cross-sectional views of the anti-defeat magnetically actuated proximity sensor 100 in a secure state. Specifically, FIGS. 5A-5B illustrate cross-sectional views through the front, back, top, and bottom of the switch unit 110 and the actuating unit 160. FIG. 5A shows the relative positioning of components of the switch unit 110 with components of the actuating unit 160, and FIG. 5B shows an example of how a magnetic field produced by the actuating unit 160 can interact with components of the switch unit 110. In both of FIGS. 5A-5B, the switch unit 110 and the actuating unit 160 in the secure state are arranged adjacent to one another such that the bottom 216 of the switch unit 110 and the top 262 of the actuating unit 160 face one another and are separated by the gap 80. In the embodiment illustrated, the front 210 and back 214 of the switch unit 110 are substantially parallel and aligned with the front 260 and back 264 of the actuating unit 160, and the sides 218 of the switch unit 110 are substantially parallel and aligned with the sides 268 of the actuating unit (e.g., as shown in FIGS. 1A-1B and FIGS. 2A-2B).

As shown in the cross-section of FIG. 5A and as mentioned previously, the switch unit 110 can include a first printed circuit board 120 having one or more reed switches 122 and a second printed circuit board 130 having one or more reed switches 132. The first printed circuit board 120 and the second printed circuit board 130 are shown in cross-section accordingly, with the boards 120 and 130 extend into/out of the page. The one or more reed switches 122 of the first printed circuit board 120 can be arranged along a first plane 20, which in some embodiments can be substantially parallel with a plane of the first printed circuit board 120 (both of which extend into/out of the page as oriented). Similarly, the one or more reed switches 132 of the second printed circuit board 130 can be arranged along a second plane 30, which in some embodiments can be substantially parallel with a plane of the second printed circuit board 130 (both of which also extend into/out of the page as oriented). The first printed circuit board 120 and the second printed circuit board 130 can be separated by one or more standoffs 125, orienting them such that they (e.g., their respective planes) can be substantially parallel to one another and aligned with the front 210 and back 214 of the switch unit 110 (e.g., they can be vertically oriented within the switch unit 110 as shown). By such arrangement, the first plane 20 of the one or more reed switches 122 and the second plane 30 of the one or more reed switches 132 can be substantially parallel to one another and separated by a distance or gap 40.

As further shown in the cross-section of FIG. 5A and as mentioned previously, the actuating unit 160 can include one or more magnets 172 of specific polarity and a magnet positioner 174 configured to position the one or more magnets 172 relative to the housing 162 of the actuating unit 160. Also shown in FIG. 5A, the one or magnets 172 can be oriented along a magnet plane 70 that can be substantially parallel to the first plane 20 and the second plane 30. Referring additionally to FIG. 5B, the one or more magnets 172 can have a first pole at a first polarity (e.g., “S” for magnetic South) and a second pole at a second polarity (e.g., “N” for magnetic North) that is opposite the first polarity with imaginary line 77 extending therebetween. The one or more magnets 172 can be oriented within the housing 162 of the actuating unit 160 (e.g., by the magnet positioner 174, which can be a rigid plastic such as Delrin, a polymer, a metal, or the like, preferably non-magnetic) such that the line 77 is substantially perpendicular to the first plane 20, the second plane 30, and the magnet plane 70. Furthermore, and as shown in FIG. 5A, the one or more magnets 172 can be oriented such that the first pole at the first polarity (e.g., “S”) is aimed towards the one or more reed switches 132 of the second printed circuit board 130 (e.g., aimed toward the back 264 of the housing 162 of the actuating unit 160) and the second pole at the second polarity (e.g., “N”) is aimed towards the one or more reed switches 122 of the first printed circuit board 120 (e.g., aimed toward the front 260 of the housing 162 of the actuating unit 160). Thus, the actuating unit 160 can produce a magnetic field 75 that can interact with the one or more reed switches 122 of the first printed circuit board 120 with the second polarity, and that can interact with the one or more reed switches 132 of the second printed circuit board 130 with the first polarity. In other words, the actuating unit 160 can advantageously produce a magnetic field 75 that can provide opposite magnetic fields to the reed switches 122 of the first printed circuit board 120 than to the reed switches 132 of the second printed circuit board 130.

The one or more magnets 172 can be neodymium magnets, and as an example can be about ⅛"×⅜"×⅞", however other materials and sizes can be used.

Figure 6A:
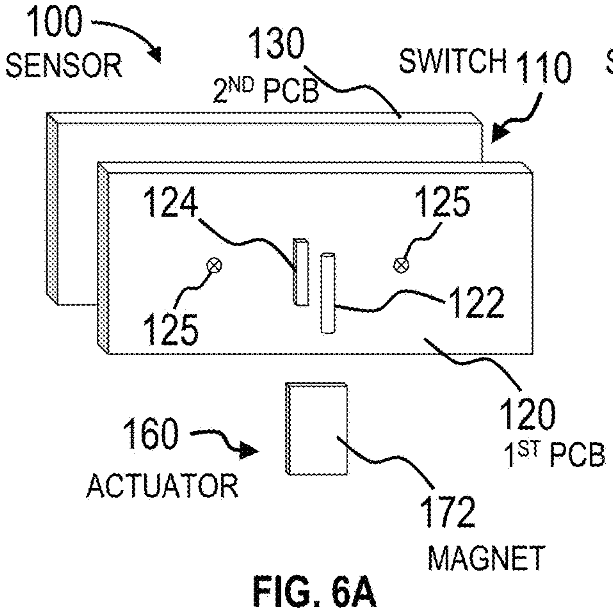
FIGS. 6A-6C illustrate an embodiment of an anti-defeat magnetically actuated proximity sensor in accordance with some aspects of this disclosure.
Figure 6B:
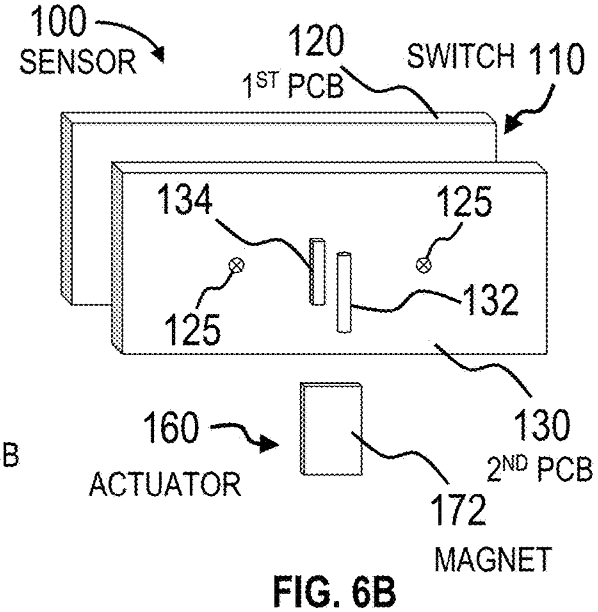
Figure 6C:
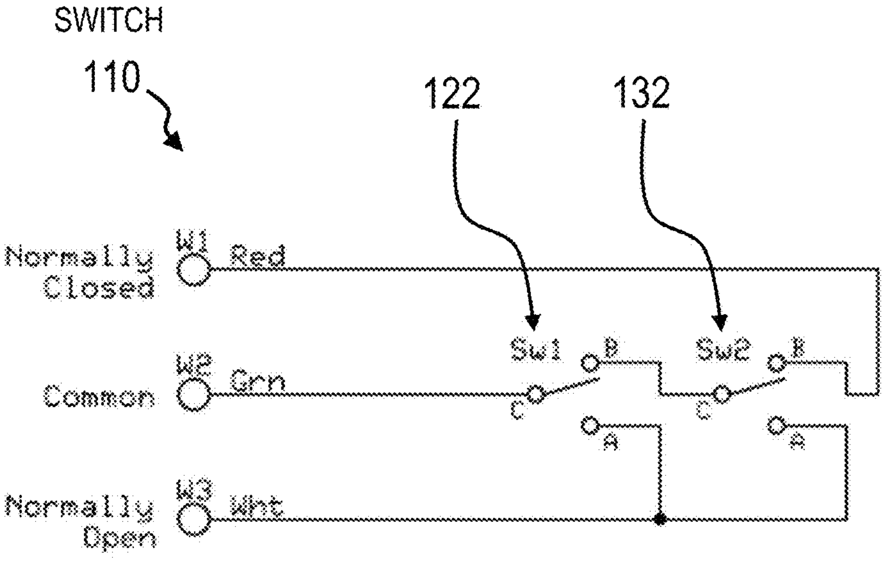

FIGS. 6A-6C illustrate an embodiment of the anti-defeat magnetically actuated proximity sensor 100. The sensor 100 includes a switch unit 110 with one reed switch per printed circuit board and an actuating unit 160 with one magnet. The housings and some of the components of each are not shown for clarity. FIG. 6A shows a front perspective view of the switch unit 110 and the actuating unit 160, FIG. 6B shows a back perspective view of the switch unit 110 and the actuating unit 160, and FIG. 6C shows a wiring schematic of the switch unit 110.

As shown in FIG. 6A, the first printed circuit board 120 can have a biasing magnet 124 arranged adjacent the reed switch 122. In an embodiment, the reed switch 122 can be a single-pole double throw reed switch (e.g., a Form C reed switch) having a first switch state and a second switch state. The first switch state can correspond to the switch being closed, and the second switch state can correspond to the switch being open. In some embodiments, the reed switch 122 is closed (e.g., in the first switch state) in the absence of an activating magnetic field and/or when the magnetic field strength acting on the reed switch 122 is below a threshold. The switch 122 is induced to open (e.g., to the second switch state) in the presence of the biasing magnet 124 without the magnet 172 of the actuating unit 160 in proximity. For example, the biasing magnet 124 can be of the first polarity as described herein (e.g., “S”) and induce the reed switch 122 to its open state without the magnet 172 of the actuating unit 160 in proximity. In other words, the reed switch 122 can be biased open at the first polarity. When the magnet 172 of the actuating unit 160 is in a certain position or within a certain range of positions relative to the reed switch 122, such as illustrated and described with respect to FIGS. 5A-5B and elsewhere herein, the magnetic field 75 of the magnet 172 acting upon the reed switch 122, which can be of the second polarity (e.g., “N”), can nullify the magnetic field produced by the biasing magnet 124 (of the first polarity, “S”) and cause the reed switch 122 to close (e.g., to assume the first switch state).

As shown in FIG. 6B, the second printed circuit board 130 can have a biasing magnet 134 arranged adjacent the reed switch 132. In an embodiment, the reed switch 132 can be a single-pole double throw reed switch (e.g., a Form C reed switch) having a first switch state and a second switch state. The first switch state can correspond to the switch being closed, and the second switch state can correspond to the switch being open. In some embodiments, the reed switch 132 is closed (e.g., in the first switch state) in the absence of an activating magnetic field and/or when the magnetic field strength acting on the reed switch 132 is below a threshold. The switch 132 is induced to open (e.g., to the second switch state) in the presence of the biasing magnet 134 without the magnet 172 of the actuating unit 160 in proximity. For example, the biasing magnet 134 can be of the second polarity as described herein (e.g., "N") that is opposite the first polarity (e.g., "S") and induce the reed switch 132 to its open state without the magnet 172 of the actuating unit 160 in proximity. In other words, the reed switch 132 can be biased open at the second polarity. When the magnet 172 of the actuating unit 160 is in a certain position or within a certain range of positions relative to the reed switch 132, such as illustrated and described with respect to FIGS. 5A-5B and elsewhere herein, the magnetic field 75 of the magnet 172 acting upon the reed switch 132, which can be of the first polarity (e.g., "S"), can nullify the magnetic field produced by the biasing magnet 134 (of the second polarity, "N") and cause the reed switch 132 to close (e.g., to assume the first switch state).

The wiring schematic of the switch unit 110 of FIG. 6C illustrates the secure state of the proximity sensor 100 wherein both reed switches, 122 and 132, are closed. As shown, the closed switch state circuit (W1) of the reed switches 122 and 132 is wired in series while the open switch state circuit (W3) of the reed switches 122 and 132 is wired in parallel. With such a wiring configuration, both reed switches 122 and 132 need to be closed (e.g., in the first switch state) in order for the proximity sensor 100 to be in the secure state. If any one of the reed switches 122 or 132 are open (e.g., in the second switch state), the proximity sensor 100 will be in the alarm state. The secure and alarm states can be determined by a monitoring, alarm, and/or security system connected to the proximity sensor 100 by monitoring the closed (W1) and open (W3) switch state circuits.

FIGS. 6A-6C provide a better understanding of embodiments of the interactions between components of the switch unit 110, such as the biasing magnet 124 and the reed switch 122 of the first printed circuit board 120 and the biasing magnet 134 and the reed switch 132 of the second printed circuit board 130, along with how these same components can interact with the magnet 172 of the actuating unit 160, and the operation of the proximity sensor 100. Referring back to FIGS. 5A-5B, for a given sensitivity of the reed switches 122 and 132 and the given distance 40 between their respective planes 20 and 30, along with given strengths of magnetic fields of the biasing magnets 124 and 134 and of the magnet 172, at least two factors can determine whether the proximity sensor 100 is in the secure state or in the alarm state. First, the position of the magnet plane 70 relative to the first plane 20 of the reed switch 122 and the second plane 30 of the reed switch 132. Second, the distance or gap 80 between the bottom 216 of the housing 122 of the switch unit 110 and the top 262 of the housing 162 of the actuating unit 160 (e.g., how far away the magnet 172 is from the reed switches 122 and 132). For example, when actuating unit 160 is positioned such that the magnetic plane 70 of the magnet 172 is not within the first plane 20 and the second plane 30 or a predefined range therebetween, the magnetic field 75 produced by magnet 172 may not be able to override both of the reed switches 122 and 132, leading to the alarm state which can trigger a monitoring, alarm, and/or security system. This can occur, for example and with respect to FIGS. 1A-1B and FIGS. 2A-2B, when the door panel 14 of the door 10 is opened away from its frame 12. As another example, when the distance or gap 80 is too great, the strength of the magnetic field 75 of the magnet 172 may not be enough to override the bias from biasing magnets 124 and 134 on reed switches 122 and 132, respectively, leading to the alarm state which can trigger a monitoring, alarm, and/or security system. Thus, manipulation of the geometry and proximity of the components of the sensor 100 can change the alarm trigger point and can depend upon the requirements for the application. For example, size and/or form factor limitations and the relative movement allowed between the parts of the structure being monitored that the switch unit 110 and the actuating unit 160 are attached to before the alarm state is triggered (e.g., how much the door panel 14 can be separated from the frame 12 before the alarm state is triggered) can all change the behavior of the sensor 100. In some cases, the proximity sensor 100 can be configured to meet the UL-634 level 2 high security standard.

In a preferred embodiment wherein the housings 112 and 162 of the switch unit 110 and actuating unit 160, respectively, have a width of about 4.5 inches, a height of about 1.5 inches, and a depth of about 1.0 inches, the distance 40 between the first plane 20 and the second plane 30 can be within the range of about 0.125 inches (⅛") to about 0.875 (⅞"), preferably within the range of about 0.375 inches (⅜") to about 0.75 inches (¾"). Additionally, with the same preferred dimensions of the housings 112 and 162, the distance 80 between the bottom 216 of the housing 112 and the top 262 of the housing 162 can be within the range of about 0.0 inches (0") to about 0.5 inches (½"), preferably within the range of about 0.0625 inches (1/16") to about 0.1875 inches (3/16"), or about 0.125 inches (⅛"). Thus, in some embodiments, the proximity sensor 100 can be configured to be in the secure state when mounted as shown in FIGS. 1A-1B and FIGS. 2A-2B. When the door 10 is closed, the magnet plane 70 is positioned between the first plane 20 and the second plane 30 as shown in FIG. 5A and/or a predefined range therebetween, and the top 262 of the housing 162 of actuating unit 160 is within the required distance or gap 80 of the bottom 216 of the housing 112 of the switch unit 110. The predefined range between the first plane 20 and the second plane 30 can be the distance between the first plane 20 and the second plane 30 or a percentage of the distance between the first plane 20 and the second plane 30, such as about 10%, about 20%, about 30%, about 40%, about 50%, about 60%, about 70%, about 80%, about 90%, or any range between about 1% to about 99% of the distance between the first plane 20 and the second plane 30. Furthermore, the proximity sensor 100 can be configured to allow some relative movement between the switch unit 110 and the actuating unit 160 without triggering the alarm state, such as can occur if the door 10 is opened slightly but not fully in reference to FIGS. 1A-1B and FIGS. 2A-2B. In some embodiments, the proximity sensor 100 can be configured to allow about 0.0625 inches (1/16"), about 0.125 inches (⅛"), about 0.1875 inches (3/16"), about 0.25 inches (¼"), about 0.3125 inches (5/16"), about 0.375 inches (⅜"), about 0.5 inches (½"), less than about 0.125 inches (⅛"), more than about 0.5 inches (½"), or any amount between about 0.0625" (1/16") and about 0.5 inches (½") of lateral movement of the actuating unit 160 (e.g., movement in the direction of the front 260 or the back 264 of the actuating unit 160) relative to the switch unit 110 without triggering the alarm state. Referring to FIGS. 1A-1B and FIGS. 2A-2B, such lateral movement can occur when the door panel 14 is moved away from its frame 12, for example, during opening of the door 10. Such a configuration can advantageously prevent false alarms.

Figure 7A:
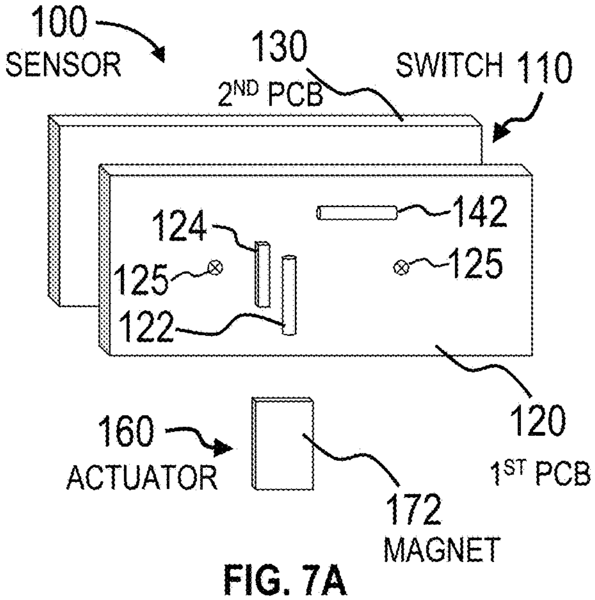
FIGS. 7A-7C illustrate another embodiment of an anti-defeat magnetically actuated proximity sensor in accordance with some aspects of this disclosure.
Figure 7B:
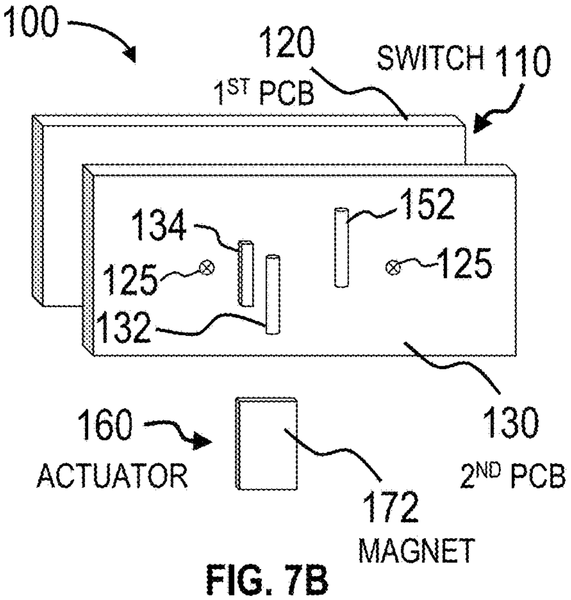
Figure 7C:
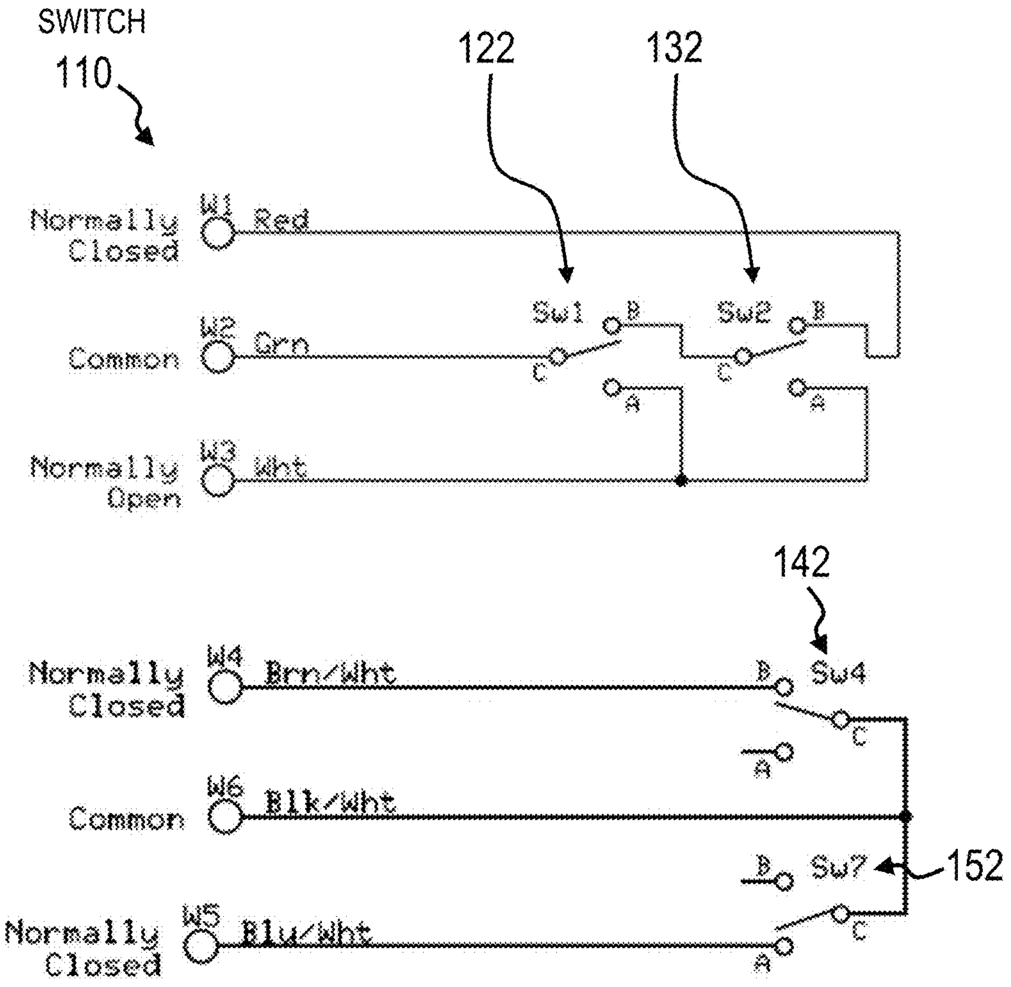

FIGS. 7A-7C illustrate another embodiment of the anti-defeat magnetically actuated proximity sensor 100 that can have the same or similar features and/or functions as the embodiment of FIGS. 6A-6C but with the addition of one or more magnetic-tamper reed switches 142 and a pry-tamper reed switch 152. Similar to FIGS. 6A-6C, the housings and some of the components of each of the switch unit 110 and the actuating unit 160 are not shown for clarity. FIG. 7A shows a front perspective view of the switch unit 110 and the actuating unit 160, FIG. 7B shows a back perspective view of the switch unit 110 and the actuating unit 160, and FIG. 7C shows a wiring schematic of the switch unit 110.

As shown in FIG. 7A, in addition to the first printed circuit board 120 having the biasing magnet 124 and the reed switch 122 as illustrated and described with respect to FIG. 6A, the first printed circuit board can include one or more magnetic-tamper reed switches 142. As shown, the first printed circuit board 120 can include one magnetic-tamper reed switches 142. The one or more magnetic-tamper reed switches 142 can be single-pole double throw reed switches (e.g., a Form C reed switch) having a first switch state and a second switch state. The first switch state can correspond to the switch being closed, and the second switch state can correspond to the switch being open. In some embodiments, the one or more magnetic-tamper reed switches 142 are closed (e.g., in the first switch state) in the absence of an activating magnetic field and are non-biased. The one or more magnetic-tamper reed switches 142 can be configured to open (e.g., to change from the first switch state to the second switch state) in the presence of an external magnetic field not from the actuating unit. For example, such an external magnetic field can be produced from a spoof or external magnet in an attempt to defeat the proximity sensor 100.

As shown in FIG. 7B, in addition to the second printed circuit board 130 having the biasing magnet 134 and the reed switch 132 as illustrated and described with respect to FIG. 6B, the second printed circuit board can include a pry-tamper reed switch 152. The pry-tamper reed switch 152 can be a single-pole single throw reed switch (e.g., a Form A reed switch) having a first switch state and a second switch state. The first switch state can correspond to the switch being closed, and the second switch state can correspond to the switch being open. In some embodiments, the pry-tamper reed switch 152 is open (e.g., in the second switch state) in the absence of an activating magnetic field and is non-biased. The pry-tamper reed switch 152 can be configured to close (e.g., to change from the second switch state to the first switch state) in the presence of a magnetic field produced by the pry-tamper spacer magnet 184 of the pry-tamper spacer 182. Thus, in some embodiments, the proximity sensor 100 is installed with the pry-tamper spacer 182 and pry-tamper reed switch 152 for it to function as intended.

The wiring schematic of the switch unit 110 of FIG. 7C illustrates the secure state of the proximity sensor 100 wherein both reed switches, 122 and 132, are closed, the magnetic-tamper reed switch 142 is closed, and the pry-tamper reed switch 152 is closed. As shown, the closed switch state circuit (W1) of the reed switches 122 and 132 is wired in series while the open switch state circuit (W3) of the reed switches 122 and 132 is wired in parallel. With such a wiring configuration, both reed switches 122 and 132 need to be closed (e.g., in the first switch state) in order for the proximity sensor 100 to be in the secure state. If any one of the reed switches 122 or 132 are open (e.g., in the second switch state), the proximity sensor 100 will be in the alarm state. The secure and alarm states can be determined by a monitoring, alarm, and/or security system connected to the proximity sensor 100 by monitoring the closed (W1) and open (W3) switch state circuits. Further as shown, by monitoring the closed (W4) switch state circuit of the magnetic-tamper reed switch 142, the monitoring, alarm, and/or security system connected to the proximity sensor 100 can determine whether or not an attempt is and/or was made to defeat the proximity sensor 100 with a spoof or external magnet. Similarly and as shown, by monitoring the closed (W5) switch state circuit of the pry-tamper reed switch 152, the monitoring, alarm, and/or security system connected to the proximity sensor 100 can determine whether or not an attempt is and/or was made to pry or remove the switch unit 110 from the structure it is mounted to, since if the switch unit 110 is separated from the pry-tamper spacer 182 the pry-tamper reed switch 152 can open (e.g., change to the second switch state).

Figure 8B:
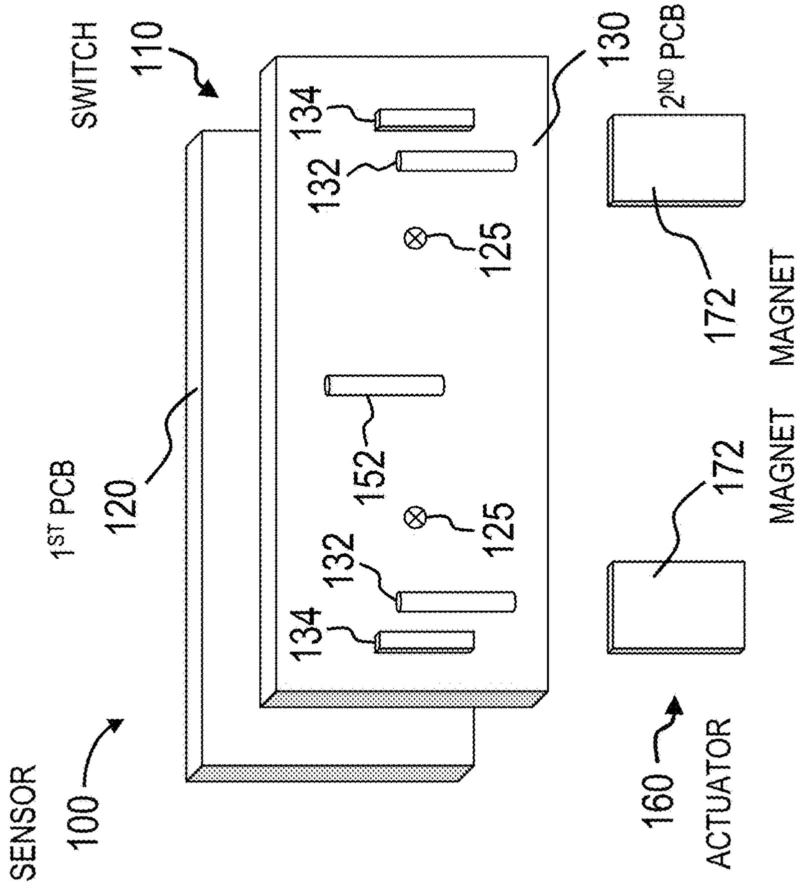
FIGS. 8A-8C illustrate another embodiment of an anti-defeat magnetically actuated proximity sensor in accordance with some aspects of this disclosure.
Figure 8A:
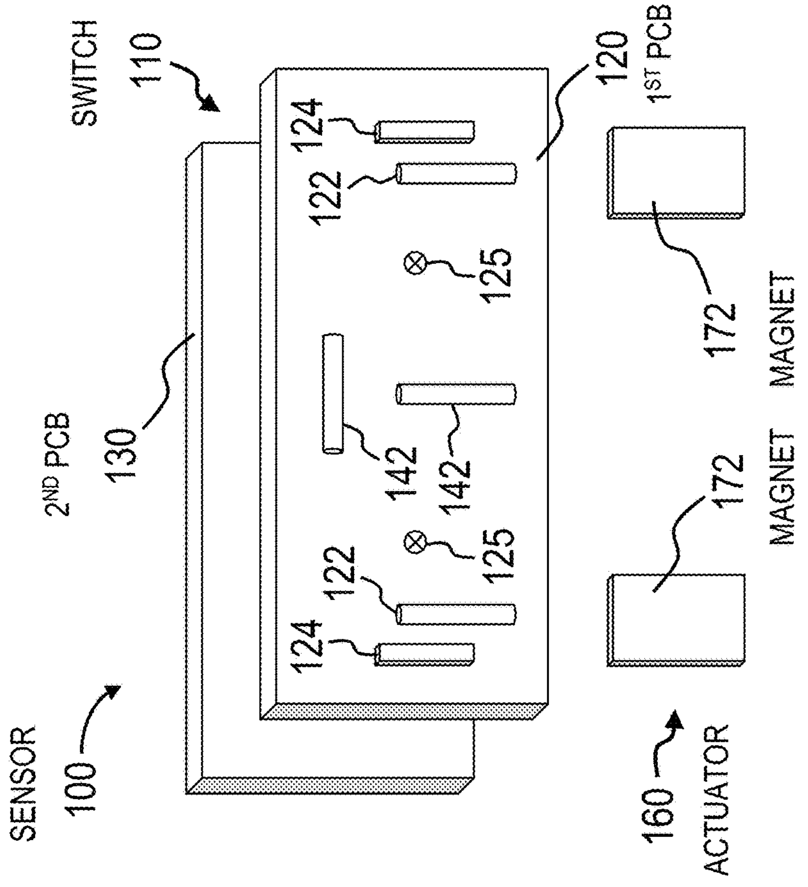
Figure 8C:
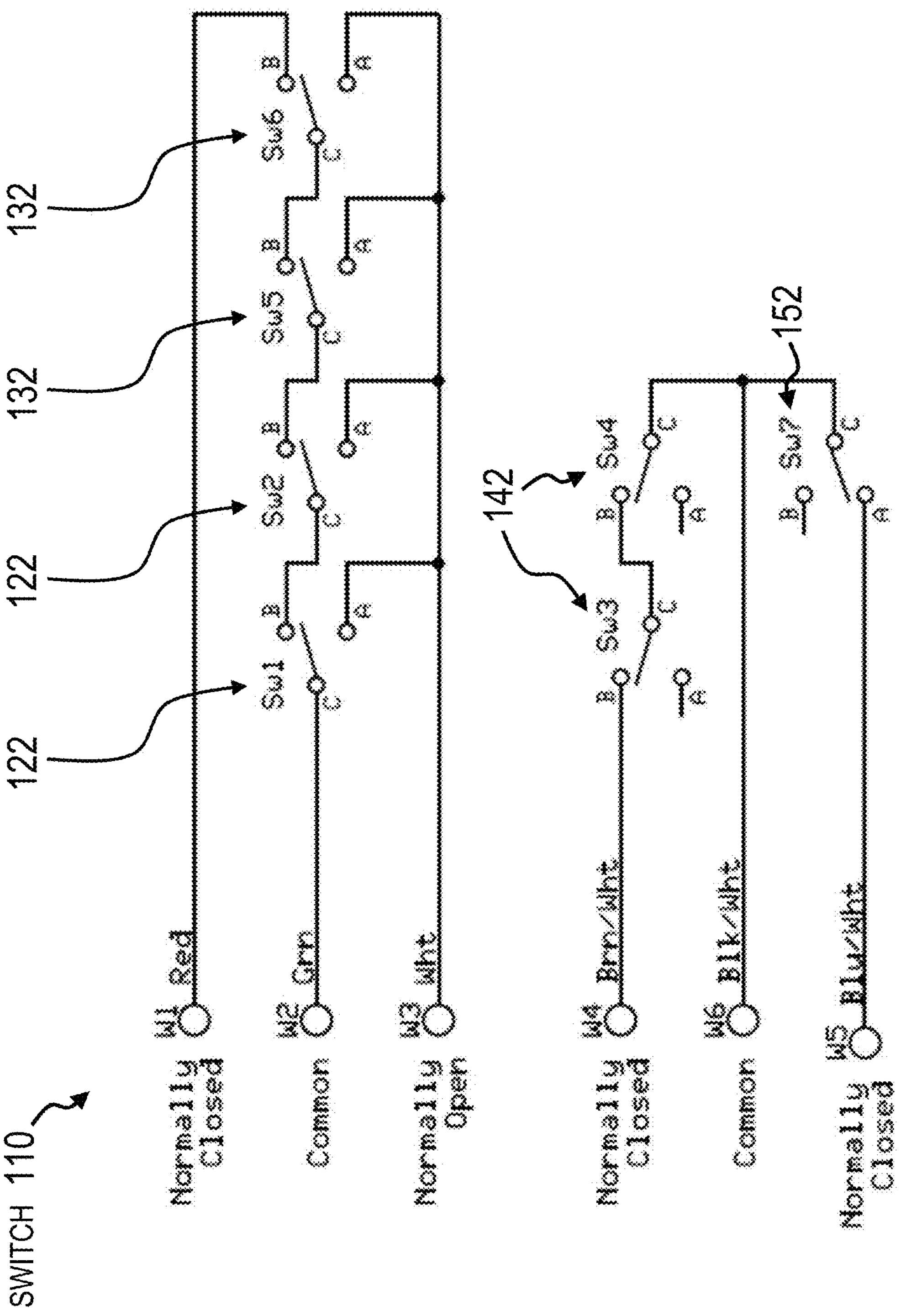

FIGS. 8A-8C illustrate another embodiment of the anti-defeat magnetically actuated proximity sensor 100 that can have the same or similar features and/or functions as the embodiment of FIGS. 7A-7C but with the addition of another reed switch 122, another biasing magnet 124, and another magnetic-tamper reed switch 142 included with the first printed circuit board 120, and another reed switch 132 and another biasing magnet 134 included with the second printed circuit board 130 of the switch unit 110. Furthermore, the embodiment of FIGS. 8A-8C includes another magnet 172 with the actuating unit 160 for interaction with the additional reed switches 122 and 132 of the switch unit 110. Similar to FIGS. 7A-7C, the housings and some of the components of each of the switch unit 110 and the actuating unit 160 are not shown for clarity. FIG. 8A shows a front perspective view of the switch unit 110 and the actuating unit 160, FIG. 8B shows a back perspective view of the switch unit 110 and the actuating unit 160, and FIG. 8C shows a wiring schematic of the switch unit 110.

As shown in FIG. 8A, the first printed circuit board 120 can include two reed switches 122, each with a corresponding biasing magnet 124. The two reed switches 122 and biasing magnets 124 can be configured the same or similarly to the reed switch 122 and biasing magnet 124 of the embodiments described with respect to FIGS. 6A-6C and FIGS. 7A-7C. As shown, the reed switches 122 and corresponding biasing magnets 124 can be arranged at opposite sides of the first printed circuit board 120. The reed switches 122 can both be aligned with the first plane 20 as described herein. Further shown, the first printed circuit board 120 can include two magnetic-tamper reed switches 142. The two magnetic-tamper reed switches 142 can be configured the same or similarly to the magnetic-tamper reed switch 142 of the embodiment described with respect to FIGS. 7A-7C. The two magnetic-tamper reed switches 142 can be located in between the two reed switches 122 as shown. Furthermore, two magnetic-tamper reed switches 142 can be arranged orthogonally to one another, which can increase the sensitivity of the proximity sensor 100 to an attempt at defeating the sensor with a spoof or external magnet. That is, were someone to try to spoof the biased reed switches 122, such spoofing magnetic field necessarily would trip one or both of the magnetic-tamper reed switches 142 based on any one or combination of their proximity, orientation and bias preference.

As shown in FIG. 8B, the second printed circuit board 130 can include two reed switches 132, each with a corresponding biasing magnet 134. The two reed switches 132 and biasing magnets 134 can be configured the same or similarly to the reed switch 132 and biasing magnet 134 of the embodiments described with respect to FIGS. 6A-6C and FIGS. 7A-7C. As shown, the reed switches 132 and corresponding biasing magnets 134 can be arranged at opposite sides of the second printed circuit board 130. The reed switches 132 can both be aligned with the second plane 30 as described herein. Further shown, the second printed circuit board 130 can include a pry-tamper reed switch 152, which can be configured the same or similarly to the pry-tamper reed switch 152 of the embodiment described with respect to FIGS. 7A-7C. The pry-tamper reed switch 152 can be located in between the two reed switches 132 as shown.

As mentioned above and as shown in FIGS. 8A-8B, the actuating unit 160 can include two magnets 172. The two magnets 172 can be configured the same or similarly to the magnet 172 of the embodiments described with respect to FIGS. 6A-6C and FIGS. 7A-7C. As shown, the magnets 172 can be arranged at opposite sides of the actuating unit 160 such that each interacts with one of the reed switches 122 of the first printed circuit board 120 and one of the reed switches 132 of the second printed circuit board 130 as illustrated and described with respect to FIG. 5B. Furthermore, the magnets 172 can both be aligned with the magnet plane 70 as illustrated and described with respect to FIG. 5A.

The wiring schematic of the switch unit 110 of FIG. 8C illustrates the secure state of the proximity sensor 100 wherein the two reed switches 122 and the two reed switches 132 are closed, the two magnetic-tamper reed switches 142 are closed, and the pry-tamper reed switch 152 is closed. As shown, the closed switch state circuit (W1) of the two reed switches 122 and the two reed switches 132 is wired in series while the open switch state circuit (W3) of the two reed switches 122 and the two reed switches 132 is wired in parallel. With such a wiring configuration, the two reed switches 122 and the two reed switches 132 need to be closed (e.g., in the first switch state) in order for the proximity sensor 100 to be in the secure state. If any one of the reed switches 122 or 132 are open (e.g., in the second switch state), the proximity sensor 100 will be in the alarm state. The secure and alarm states can be determined by a monitoring, alarm, and/or security system connected to the proximity sensor 100 by monitoring the closed (W1) and open (W3) switch state circuits. Further as shown, by monitoring the closed (W4) switch state circuit of the two magnetic-tamper reed switches 142, the monitoring and/or alarm system connected to the proximity sensor 100 can determine whether or not an attempt is and/or was made to defeat the proximity sensor 100 with a spoof or external magnet. Similarly and as shown, by monitoring the closed (W5) switch state circuit of the pry-tamper reed switch 152, the monitoring, alarm, and/or security system connected to the proximity sensor 100 can determine whether or not an attempt is and/or was made to pry or remove the switch unit 110 from the structure it is mounted to, since if the switch unit 110 is separated from the pry-tamper spacer 182 the pry-tamper reed switch 152 can open (e.g., change to the second switch state).

Figures 9A, 9B, 9C, 9D:
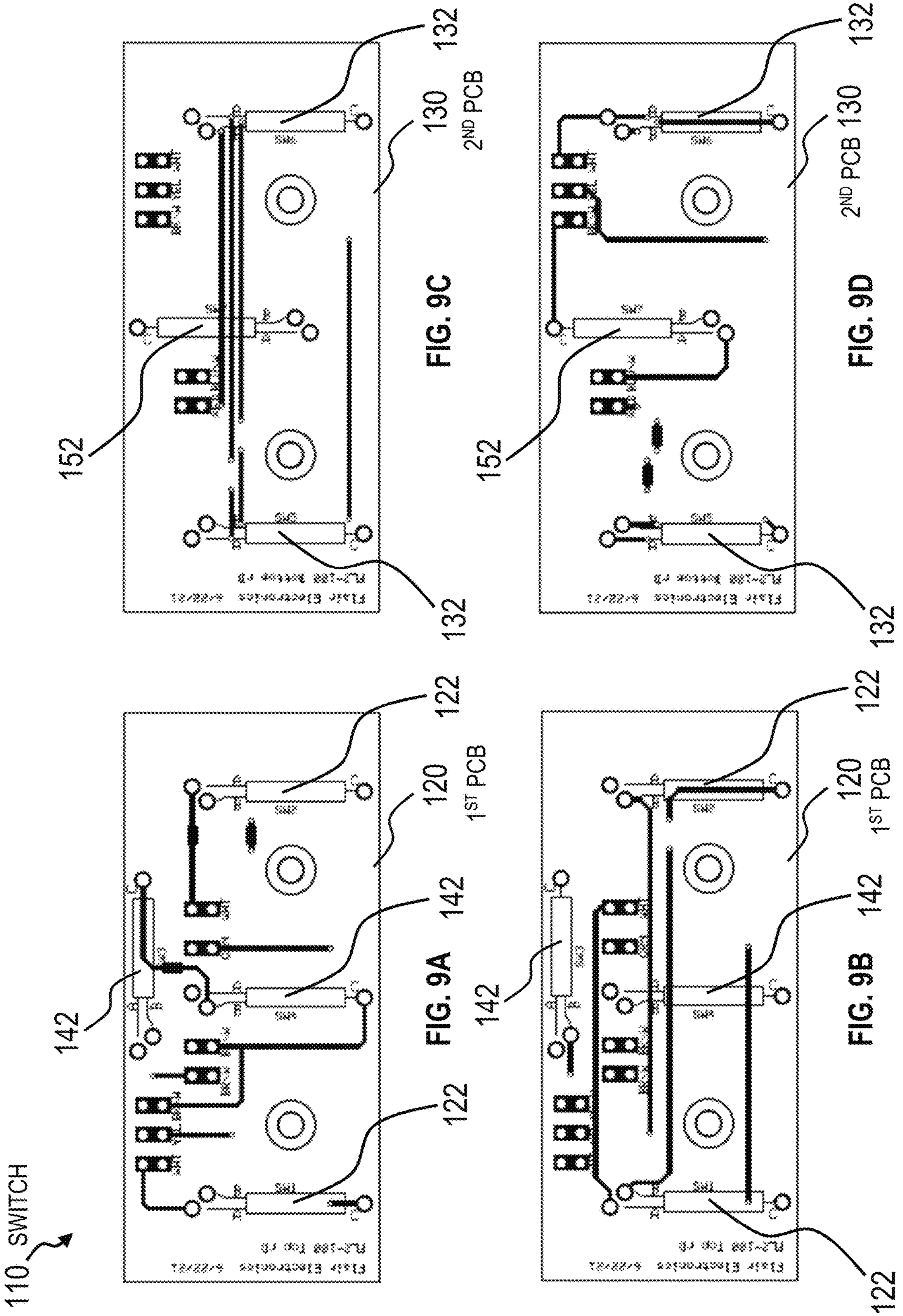
FIGS. 9A-9D illustrate exemplary layouts for the printed circuit boards of a switch unit according to the embodiment of an anti-defeat magnetically actuated proximity sensor of FIGS. 8A-8C.

FIGS. 9A-9D illustrate exemplary layouts for the first and second printed circuit boards of the switch unit 110 according to the embodiment of the anti-defeat magnetically actuated proximity sensor of FIGS. 8A-8C. FIG. 9A shows a front side of the first printed circuit board 120, FIG. 9B shows a back side of the first printed circuit board 120, FIG. 9C shows a front side of the second printed circuit board 130, and FIG. 9D shows a back side of the second printed circuit board 130. FIGS. 9A-9B show the reed switches 122 and the magnetic-tamper reed switches 142 along with exemplary wiring layouts corresponding to the wiring diagram of FIG. 8C. FIGS. 9C-9D show the reed switches 132 and the pry-tamper reed switch 152 along with exemplary wiring layouts corresponding to the wiring diagram of FIG. 8C. FIGS. 9A-9D do not show the biasing magnets 124 and 134 corresponding to the reed switches 122 and 132, respectively.

Embodiments of a proximity sensor 100 including either one or more magnetic-tamper reed switches 142 or a pry-tamper reed switch 152 are generally installed such that the second printed circuit board 130 (which can include the one or more magnetic-tamper reed switches 142) is closest to the surface the proximity sensor 100 is mounted to and the first printed circuit board 120 (which can include the one or more magnetic-tamper reed switches 142) is away from the surface the proximity sensor 100 is mounted to. Installed as such, the pry-tamper reed switch 152 can interact with the pry-tamper spacer magnet 184 of the pry-tamper spacer 182 if present, and the one or more magnetic-tamper reed switches 142 can interact with any external spoof/substitute magnet if there is an attempt to tamper with the proximity sensor 100.

In an exemplary installation of a proximity sensor 100 to an outswing door 10 as shown in FIGS. 1A-1B, for example a proximity sensor 100 according to either the embodiment of FIGS. 7A-7C or FIGS. 8A-8C, the process of installation can include: mounting a pry-tamper spacer 182 to the door frame 12 (e.g., as low as possible and in the center of the door frame 12), mounting an appropriately sized spacer 186 below the pry-tamper spacer 182 by a distance 80 as described herein (e.g., ⅛") such that the front of the spacer 186 aligns with the front of the pry-tamper spacer 182, mounting a switch unit 110 over the pry-tamper spacer 182 (e.g., with indicia 220 facing away from the door frame 12), and mounting an actuating unit 160 over the spacer 186 (e.g., with indicia 270 facing away from the door frame 12).

In an exemplary installation of a proximity sensor 100 to an inswing door 10 as shown in FIGS. 2A-2B, for example a proximity sensor 100 according to either the embodiment of FIGS. 7A-7C or FIGS. 8A-8C, the process of installation can include: mounting a pry-tamper spacer 182 to the door frame 12 (e.g., in the center of the door frame and leaving an air gap 90 between the pry-tamper spacer 182 and the door panel 14), mounting a switch unit 110 over the pry-tamper spacer 182 (e.g., with indicia 220 facing away from the door panel 14), mounting an appropriately sized spacer 186 below the bottom of the switch unit 110 by a distance 80 as described herein (e.g., ⅛") such that the front of the spacer 186 aligns with the back of the switch unit 110, and mounting an actuating unit 160 over the spacer 186 (e.g., with indicia 270 facing away from the door panel 14).

Figure 10:
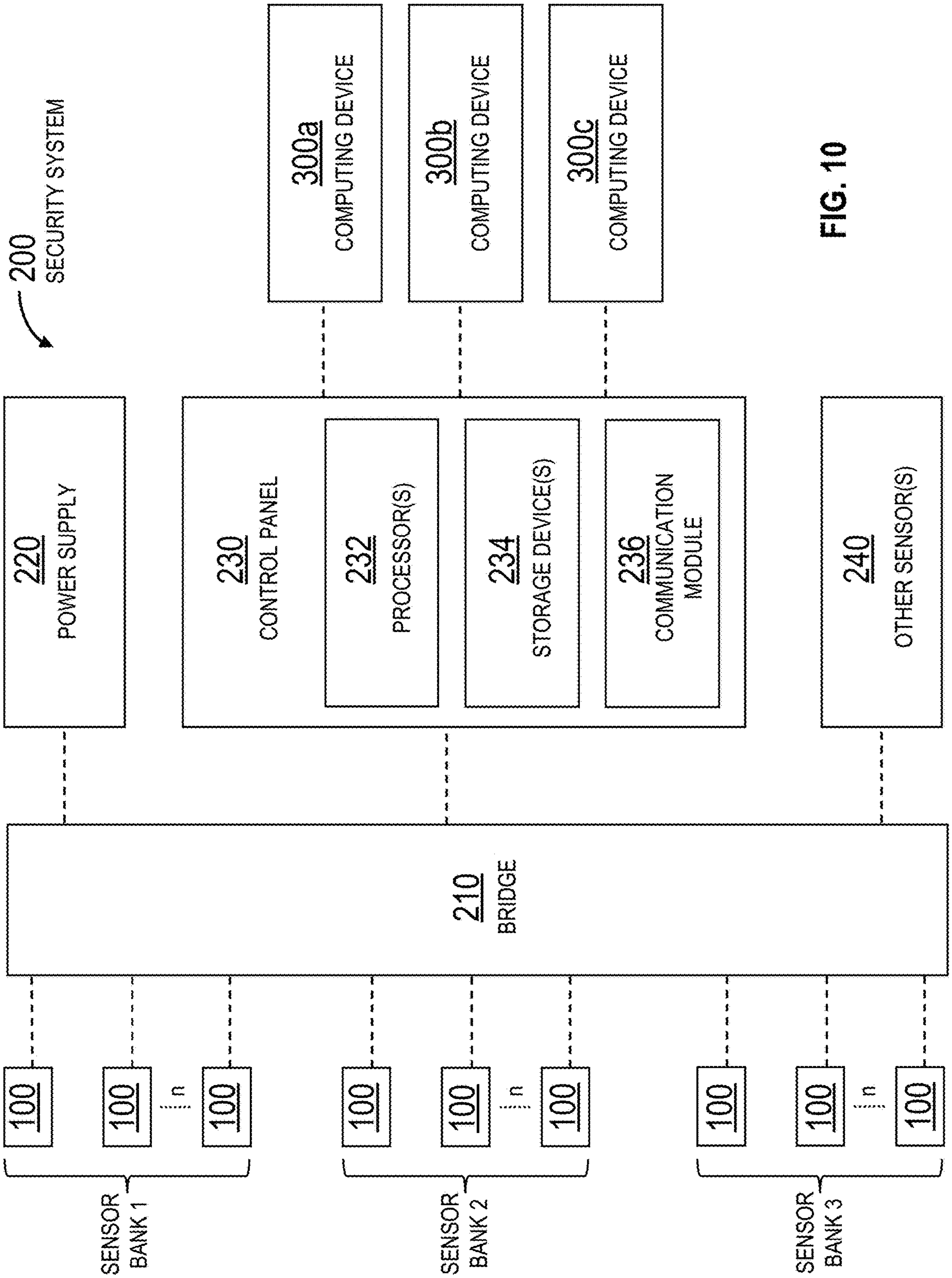
FIG. 10 illustrates an exemplary implementation of a monitoring, alarm, and/or security system operably connected to one or more proximity sensors in accordance with some aspects of this disclosure.

FIG. 10 illustrates an example implementation of a monitoring, alarm, and/or security system 200 operably connected to one or more proximity sensors 100. As shown, the one or more proximity sensors 100 can be grouped/organized into one or more banks of sensors each comprising 1 through n proximity sensors 100, such as a sensor bank 1, a sensor bank 2, and a sensor bank 3, however more or less sensor banks or no sensor banks at all can be implemented. The implementation shown in FIG. 10 can be configured for use in a residential setting, a commercial setting, a government/military setting, or the like. As shown, the monitoring, alarm, and/or security system 200 can include a bridge 210, a power supply 220, and a control panel 230. The control panel 230 can include one or more processors 232, one or more storage devices 234, and a communication module 236. In some implementations, the monitoring, alarm, and/or security system 200 can include one or more other sensors 240 as described herein. Furthermore, the monitoring, alarm, and/or security system 200 can communicate with one or more external devices such as computing devices 300*a*,

300*b* and 300*c*. The computing devices 300*a*. 300*b* and 300*c* can include one or more devices such as a mobile phone, a laptop computer, a desktop computer, a server, and the like.

The bridge 210 can be configured to operably connect one or more proximity sensors 100 to the power supply 220 and the control panel 230 of the monitoring, alarm, and/or security system 200. In implementations with one or more other sensors 240, the bridge can also operably connect such sensors 240 to the control panel 230 and power supply 240.

The one or more processors 232 of the control panel 230 can be configured, among other things, to process data, execute instructions to perform one or more functions, and/or control operation of the monitoring, alarm, and/or security system 200. For example, the processor(s) 232 can control operation of the one or more proximity sensors 100, such as the one or more proximity sensors 100 of sensor banks 1, 2, and 3. As another example, the processor(s) 232 can process signals received and/or data obtained from the one or more proximity sensors 100. Furthermore, the processor(s) 232 can execute instructions to perform functions related to storing and/or transmitting such signals received and/or data obtained from the one or more proximity sensors 100. The processor(s) 232 can execute instructions to perform functions related to storing and/or transmitting any or all of such received signals and/or data. In implementations with one or more other sensors 240, the processor(s) 232 can similarly control operation thereof, process signals received and/or data obtained therefrom, and/or execute instructions to perform functions related to storing and/or transmitting such signals received therefrom.

The one or more storage devices 234 can include one or more memory devices that store data, including without limitation, dynamic and/or static random access memory (RAM), programmable read-only memory (PROM), erasable programmable read-only memory (EPROM), electrically erasable programmable read-only memory (EEPROM), and the like. Such stored data can be processed and/or unprocessed signals and/or data obtained from the one or more proximity sensors 100, such as the proximity sensors 100 from sensors banks 1, 2 and 3 shown, and/or from the other sensor(s) 240.

The communication module 236 can facilitate communication (via wires and/or wireless connection) between the monitoring, alarm, and/or security system 200 (and/or components thereof) and separate devices, such as separate monitoring, computing, electrical, and/or mobile devices (e.g., computing devices 300*a*, 300*b*, and/or 300*c*). For example, the communication module 236 can be configured to allow the monitoring, alarm, and/or security system 200 to wirelessly communicate with other devices, systems, and/or networks over any of a variety of communication protocols. The communication module 236 can be configured to use any of a variety of wireless communication protocols, such as Wi-Fi (802.11x), Bluetooth®, ZigBee®, Z-Wave®, cellular telephony, infrared, near-field communications (NFC), RFID, satellite transmission, proprietary protocols, combinations of the same, and the like. The communication module 236 can allow data and/or instructions to be transmitted and/or received to and/or from the monitoring, alarm, and/or security system 200 and separate computing devices (e.g., computing devices 300*a*, 300*b*, and/or 300*c*). The communication module 236 can be configured to transmit (for example, wirelessly) processed and/or unprocessed signals, data and/or other information to one or more separate computing devices, which can include, among others, a mobile device (for example, an iOS or Android enabled smartphone, tablet, laptop), a desktop computer, a server or other computing or processing device for display and/or further processing, among other things. Such separate computing devices can be configured to store and/or further process the received signals, data, and/or other information, to display information indicative of or derived from the received signals, data, and/or information, and/or to transmit information—including displays, alarms, alerts, and notifications—to various other types of computing devices and/or systems that can be associated with the monitoring, alarm, and/or security system 200 and/or a user (for example, a home owner, a security officer, a monitoring personnel) that has permission to access the monitoring, alarm, and/or security system 200. As another example, the communication module 236 of the monitoring, alarm, and/or security system 200 can be configured to wirelessly transmit processed and/or unprocessed obtained signals, data, and/or information to a mobile phone which can include one or more hardware processors configured to execute an application that generates a graphical user interface displaying information representative of the processed or unprocessed signals, data, and/or information obtained from the monitoring, alarm, and/or security system 200. The communication module 236 can be and/or include a wireless transceiver.

The power supply 220 can provide power for the hardware components of the monitoring, alarm, and/or security system 200, the one or more proximity sensors 100 (such as those of sensors banks 1, 2 and 3), and other sensor(s) 240 if included. The power supply 220 can be tied to the electrical grid (such as from a local utility provider), or it can be stand-alone (such as from a power plant or power source unconnected to the local utilities). In some implementations, the power supply can be configured to connect to an uninterrupted power supply (such as a battery bank with controller) in case electrical grid power goes out, or otherwise configured to connect to a source of emergency back-up power (such as an emergency generator). In some implementations, the power supply can connect to a battery bank that is provided with solar power and/or other form of renewable energy.

The one or more other sensors 240 can include one or more other monitoring and/or security sensors or devices. For example, the other sensor(s) 240 can include one or more indoor cameras, one or more outdoor cameras, one or more motions sensors, one or more fire detectors, one or more carbon monoxide detectors, and the like. Such other sensor(s) 240 can augment the one or more proximity sensors 100.

In use, the control panel 230 can receive a certain signal from the one or more proximity sensors 100 operably connected thereto when in the secured condition and a changed signal when in the alarm condition. In some implementations, the control panel 230 can receive more than one certain signals from the one or more proximity sensors 100 operably connected thereto when in the secured condition and a changed more than one signals when in the alarm condition. One of ordinary skill in the art will know from the disclosure herein that such signals can comprise receiving a current from a proximity sensor 100, not receiving a current from the proximity sensor 100, receiving current in both conditions but of a different magnitude, and the like. For example and with reference to FIG. 8C, the control panel 230 can receive a current from the closed switch state circuit (W1) and no current (or a different magnitude of current) from the open switch state circuit (W3) when a corresponding proximity sensor 100 is in the secured condition. Continuing with the example, the control panel 230 can receive a current from the open switch state circuit (W3) and no current (or a different magnitude of current) from the closed switch state circuit (W1) when a corresponding proximity sensor 100 is in the alarm condition.

With reference to FIG. 10, in an exemplary implementation in a residential setting, sensor bank 1 can correspond to 1 through n proximity sensors 100 operably mounted to detect the state/status, such as the secured condition (e.g., a closed door/window) or the alarm condition (e.g., an open door/window), of a garage door and/or other doors of a garage. Additionally, sensor bank 2 can correspond to 1 through n proximity sensors 100 operably mounted to detect the state/status of doors throughout the residence, such as a front door, a back door, a side door, and the like. Furthermore, sensor bank 3 can correspond to 1 through n proximity sensors 100 operably mounted to detect the state/status of windows throughout the residence. The monitoring, alarm, and/or security system 200 can include other sensors 240 such as a doorbell camera, indoor camera(s), outdoor camera(s), motion detectors, and/or any others described herein to augment the information provided by the one or more proximity sensors 100 of sensor banks 1, 2 and 3.

The monitoring, alarm, and/or security system 200 can communicate with separate computing devices 300*a*, 300*b*, and 300*c* to convey the state/status of the one or more proximity sensors 100 of banks 1, 2 and 3. Furthermore, the monitoring, alarm, and/or security system 200 can communicate with separate computing devices 300*a*, 300*b*, and 300*c* to allow control of operation of the one or more proximity sensors 100 of banks 1, 2 and 3. As an example, the computing device 300*a* can include a mobile phone of a resident of the residence, and information provided to the mobile phone from the monitoring, alarm, and/or security system 200 and can be accessed through a phone application. Such a phone application can be configured to allow the resident to view the state/status of the one or more proximity sensors 100 operably connected to the monitoring, alarm, and/or security system 200 as well as control the operation of such proximity sensors 100. The computing device 300*b* can include an in-residence computer configured to allow a resident to view the state/status of the one or more proximity sensors 100 operably connected to the monitoring, alarm, and/or security system 200 as well as control the operation such proximity sensors 100. As another example, the computing device 300*c* can include a computing device of a remote monitoring/alarm/security agency outside the residence configured to allow the monitoring/alarm/security agency to view the state/status of the one or more proximity sensors 100 operably connected to the monitoring, alarm, and/or security system 200 as well as control the operation of such proximity sensors 100. Such a remote monitoring/alarm/security agency can alert the residents and/or authorities (e.g., the police) when any one of the one or more proximity sensors 100 is in an alarm condition. Any one of the computing devices 300*a*. 300*b*, and/or 300*c* can also be configured to view the state/status of and/or control the operation of one or more other sensor(s) 240 if included in the monitoring, alarm, and/or security system 200.

With further reference to FIG. 10, in an exemplary implementation in a commercial setting, sensor bank 1 can correspond to 1 through n proximity sensors 100 operably mounted to detect the state/status, such as the secured condition (e.g., a closed door/window) or the alarm condition (e.g., an open door/window), of one or more doors, windows, cabinets, safes, desks, or the like of a facility. Additionally, sensor bank 2 can correspond to 1 through n proximity sensors 100 operably mounted to detect the state/status of one or more roll-up doors of the facility, such as in a loading area of the facility. Furthermore, sensor bank 3 can correspond to 1 through n proximity sensors 100 operably mounted to detect the state/status of windows throughout the facility. The monitoring, alarm, and/or security system 200 can include other sensors 240 such as indoor camera(s), outdoor camera(s), motion detectors, and/or any others described herein to augment the information provided by the one or more proximity sensors 100 of sensor banks 1, 2 and 3.

The monitoring, alarm, and/or security system 200 can communicate with separate computing devices 300*a*. 300*b*, and 300*c* to convey the state/status of the one or more proximity sensors 100 of banks 1, 2 and 3. Furthermore, the monitoring, alarm, and/or security system 200 can communicate with separate computing devices 300*a*, 300*b*, and 300*c* to allow control of operation of the one or more proximity sensors 100 of banks 1, 2 and 3. As an example, the computing device 300*a* can include a mobile phone of a security personnel of the commercial facility, and information provided to the mobile phone from the monitoring, alarm, and/or security system 200 and can be accessed through a phone application. Such a phone application can be configured to allow the security personnel to view the state/status of the one or more proximity sensors 100 operably connected to the monitoring, alarm, and/or security system 200 as well as control the operation of such proximity sensors 100. The computing device 300*b* can include an in-facility computer configured to allow a security personnel to view the state/status of the one or more proximity sensors 100 operably connected to the monitoring, alarm, and/or security system 200 as well as control the operation of such proximity sensors 100. As another example, the computing device 300*c* can include a computing device of a remote monitoring/alarm/security agency outside the commercial facility configured to allow the monitoring/alarm/security agency to view the state/status of the one or more proximity sensors 100 operably connected to the monitoring, alarm, and/or security system 200 as well as control the operation such proximity sensors 100. Such a remote monitoring/alarm/security agency can alert the security personnel of the facility and/or authorities (e.g., the police) when any one of the one or more proximity sensors 100 is in an alarm condition. Any one of the computing devices 300*a*, 300*b*, and/or 300*c* can also be configured to view the state/status of and/or control the operation of one or more other sensor(s) 240 if included in the monitoring, alarm, and/or security system 200.

While various embodiments of a proximity sensor 100 have been described herein, various alterations or substitutions can be made thereto that are included within the scope of this disclosure. For example, while reed switches illustrated and described herein, such as the reed switches 122, the reed switches 132, the magnetic-tamper reed switches 142, and the pry-tamper reed switch 152, have been shown as having a particular orientation, such as aligned with the sides 115 of the switch unit 110 or aligned with the top 212 and bottom 216 of the switch unit 110, the reed switches can be oriented in any direction along their respective plane (e.g., along the first plane 20 if included with the first printed circuit board 120 and along the second plane 30 if included with the second printed circuit board 130). As another example, the biased polarities of the reed switches 122 of the first printed circuit board 120 and the biased polarities of the reed switches 132 of the second printed circuit board 130 can be swapped if the polarities of the magnet(s) 172 are swapped in kind.

The proximity sensors 100 described herein can be wired independently or together to form a zone. For example, a room can contain a plurality of windows each having a proximity sensor 100; if it is desired to only know if one of the plurality of windows is open, all proximity sensors 100 could be wired such that the room forms a zone.

Additionally, the housings of the sensor components can have virtually any shaped cross section. For example, while the figures illustrate the switch unit housing and actuating unit housing as having cross sections with a periphery that is generally rectangular, an artisan will recognize from the disclosure herein that the cross sections could be any polygonal, including square, octagonal, or the like, circular, oval, complex combinations of the same or the like.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate after reviewing the disclosure herein that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize, after reviewing the disclosure herein, that the disclosure may be embodied or carried out in a manner that achieves one advantage or a group of advantages as taught herein without necessarily achieving other advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising." "including." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The term "and/or" has similar meaning in that when used, for example, in a list of elements, the term "and/or" means one, some, or all of the elements in the list, but does not require any individual embodiment to have all elements.

Language of degree used herein, such as the terms "approximately." "about." "generally." and "substantially" as used herein represent a value, amount, or characteristic close to the stated value, amount, or characteristic that still performs a desired function or achieves a desired result. For example, the terms "approximately", "about", "generally." and "substantially" may refer to an amount that is within less than 10% of, within less than 5% of, within less than 1% of, within less than 0.1% of, and within less than 0.01% of the stated amount.

Values and ranges of values disclosed herein are examples and should not be construed as limiting. The values and ranges of values disclosed herein can be altered while gaining the advantages discussed herein. The listed ranges of values disclosed herein can include subsets of ranges or values which are part of this disclosure. Disclosed ranges of values or a single value for one feature can be implemented in combination with any other compatible disclosed range of values or value for another feature. For example, any specific value within a range of dimensions for one element can be paired with any specific value within a range of dimensions for another element.

All of the methods and tasks described herein may be performed and fully automated by a computer and/or manufacturing system. The computer and/or manufacturing system may, in some cases, include multiple distinct computers or computing devices (e.g., physical servers, workstations, storage arrays, cloud computing resources, etc.) that communicate and interoperate over a network The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Additionally, all publications, patents, and patent applications mentioned in this specification are herein incorporated by reference to the same extent as if each individual publication, patent, or patent application was specifically and individually indicated to be incorporated by reference.

What is claimed is:

1. A proximity sensor configured to change from a secured condition to an alarm condition responsive to a proximity between a movable element to a stable structure, the secured condition and the alarm condition discernible by a security system, the sensor comprising:

- a switch housing operably positioning first and second circuit boards within the switch housing and configured to operably mount to a stable structure;
- an actuator housing operably positioning a magnet within the actuator housing and configured to operably mount to an element movable with respect to the stable structure, the actuator housing operably mounted to be proximate the switch housing when the moveable element is secured with respect to the stable structure;
- the first circuit board including a first switch arranged along a first plane, the first switch including first and second states, the first state including one of open and closed and the second state including the other of open and closed;
- the second circuit board including a second switch arranged along a second plane substantially parallel to the first plane, the second switch including the first and second states;
- wherein the first plane is separated from the second plane by a distance;
- wherein when the actuator housing is proximate the switch housing such that the magnet is positioned between the first and second planes, the first switch is responsive to a first polarity of the magnet to be in its first state and the second switch is responsive to a second polarity of the magnet opposite the first polarity to be in its first state thereby placing the sensor in the secured condition; and
- wherein when the actuator housing is moved away from the switch housing, at least one of the first switch and the second switch changes to its second state thereby placing the sensor in the alarm condition.

2. The proximity sensor of claim 1, wherein the switch housing operably positions the first circuit board substantially parallel to the second circuit board, the first and second circuit boards separated within the switch housing by a gap.

3. The proximity sensor of claim 2, wherein the gap is less than one inch (<1.0").

4. The proximity sensor of claim 2, wherein when the actuator housing is proximate the switch housing, the actuator housing operably positions the magnet below the gap but between planes formed by the positioning of the first and second circuit boards.

5. The proximity sensor of claim 1, wherein when the actuator housing is proximate the switch housing, a surface of the actuator housing is less than one quarter inch (<¼", <0.25") from a surface of the switch housing.

6. The proximity sensor of claim 1, wherein one of the first and second circuit boards includes at least one magnetic-tamper switch.

7. The proximity sensor of claim 1, wherein one of the first and second circuit boards includes at least one pry-tamper switch.

8. The proximity sensor of claim 7, wherein the other of the first and second circuit boards includes at least one magnetic-tamper switch.

9. The proximity sensor of claim 1, comprising armored wire.

10. The proximity sensor of claim 1, wherein at least one of the switch housing and the actuator housing is at least partially filled with encapsulate.

11. The proximity sensor of claim 1, wherein at least one of the switch housing and the actuator housing comprises aluminum.

12. The proximity sensor of claim 1, wherein a periphery of a cross section of the switch housing comprises a rectangle and a periphery of a cross section of the actuator housing comprises a rectangle.

13. The proximity sensor of claim 1, wherein the movable element comprises a door or window and the stable structure comprises a frame.

14. The proximity sensor of claim 13, wherein a first spacer operably mounts between the switch housing and the frame and a second spacer operably mounts between the actuator housing and door or window.

15. The proximity sensor of claim 14, wherein the first and second spacers include widths and the width of the first spacer is different that the width of the second spacer.

16. The proximity sensor of claim 1, wherein

- the first circuit board further includes a third switch including first and second states;
- the second circuit board further includes a fourth switch including first and second states; and
- the magnet comprises a first magnet and the actuator housing positions a second magnet within the actuator housing;
- wherein when the actuator housing is proximate the switch housing, (i) the first switch is responsive to the first magnet to be in its first state, (ii) the third switch is responsive to the second magnet to be in its first state, (iii) the second switch is responsive to the first magnet to be in its first state, and (iv) the fourth switch is responsive to the second magnet to be in its first state, all of (i)-(iv) thereby placing the sensor in the secured condition; and
- wherein when the actuator housing is moved away from the switch housing, at least one of the first, second, third, and fourth switches changes to its second state thereby placing the sensor in the alarm condition.

17. The proximity sensor of claim 16, wherein the first, second, third, and fourth switches each comprise a reed switch.

18. The proximity sensor of claim 17, comprising:

- a first biasing magnet biasing the first reed switch to its second state;
- a second biasing magnet biasing the second reed switch to its second state;
- a third biasing magnet biasing the third reed switch to its second state; and
- a fourth biasing magnet biasing the fourth switch to its second state.

19. The proximity sensor of claim 18, wherein:

- the first state of the first reed switch is responsive to a first polarity of the first magnet;

the first state of the second reed switch is responsive to a second polarity of the first magnet opposite the first polarity;

the first state of the third reed switch is responsive to a first polarity of the second magnet; and the first state of the fourth reed switch is responsive to a second polarity of the second magnet opposite the first polarity.

20. The proximity sensor of claim 19, wherein the first polarity of the first magnet is the same as the first polarity of the second magnet.

21. The proximity sensor of claim 16, wherein one of the first and second circuit boards includes at least one magnetic-tamper switch.

22. The proximity sensor of claim 16, wherein one of the first and second circuit boards includes two magnetic-tamper switches operably positioned orthogonal to one another.

23. The proximity sensor of claim 16, wherein one of the first and second circuit boards includes at least one pry-tamper switch.

24. The proximity sensor of claim 22, wherein the other of the first and second circuit boards includes at least one magnetic-tamper switch.

25. The proximity sensor of claim 24, wherein the pry-tamper switch and the magnetic-tamper switch each comprise a reed switch.

26. The proximity sensor of claim 16, comprising armored wire.

27. The proximity sensor of claim 16, wherein the switch housing and the actuator housing are filled with encapsulate.

28. The proximity sensor of claim 16, wherein a security system is responsive to the secured condition and the alarm condition to provide an alert when the sensor changes from the secured condition to the alarm condition.

* * * * *